United States Patent
Jarisch

(10) Patent No.: US 10,789,743 B2
(45) Date of Patent: *Sep. 29, 2020

(54) EXTENDED HIGH EFFICIENCY COMPUTED TOMOGRAPHY WITH OPTIMIZED RECURSIONS AND APPLICATIONS

(71) Applicant: Wolfram R. Jarisch, Potomac, MD (US)

(72) Inventor: Wolfram R. Jarisch, Potomac, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/694,601

(22) Filed: Nov. 25, 2019

(65) Prior Publication Data
US 2020/0090385 A1 Mar. 19, 2020

Related U.S. Application Data

(63) Continuation of application No. 15/816,745, filed on Nov. 17, 2017.
(Continued)

(51) Int. Cl.
*G06K 9/00* (2006.01)
*G06T 11/00* (2006.01)

(52) U.S. Cl.
CPC .......... *G06T 11/006* (2013.01); *G06T 11/008* (2013.01); *G06T 2211/421* (2013.01); *G06T 2211/424* (2013.01)

(58) Field of Classification Search
CPC ..... A61B 6/032; A61B 6/5258; G06T 11/008; G06T 11/006; G06T 2211/424
(Continued)

(56) References Cited

U.S. PATENT DOCUMENTS

| 4,593,355 A | 6/1986 | Chase |
| 5,414,623 A | 5/1995 | Lu |

(Continued)

FOREIGN PATENT DOCUMENTS

| WO | 2007/120300 A2 | 10/2007 |
| WO | 2009/158718 A1 | 12/2009 |

(Continued)

OTHER PUBLICATIONS

Bouman, et al., "A Generalized Gaussian Image Model for Edge-Preserving MAP Estimation," Purdue e-Pubs, ECE Technical Reports, Paper 277, 1992 [Cited in Parent].
(Continued)

*Primary Examiner* — Charlotte M Baker
(74) *Attorney, Agent, or Firm* — Baker Botts L.L.P.; Michael A. Sartori

(57) ABSTRACT

An image reconstructor to: receive projection space data; compute one or more measured transformed pixels; compute one or more predicted transformed pixels; compute first pixel innovation result data; compute second pixel innovation result data; compute preliminary transformed object update data; compute a transformed object voxel density update estimate; add the transformed object voxel density update estimate to a corresponding transformed preceding voxel data estimate; and reconstruct an object space image representing the object under observation using the transformed density estimate.

21 Claims, 8 Drawing Sheets
(7 of 8 Drawing Sheet(s) Filed in Color)

Related U.S. Application Data

(60) Provisional application No. 62/424,187, filed on Nov. 18, 2016, provisional application No. 62/426,065, filed on Nov. 23, 2016.

(58) Field of Classification Search
USPC .......................................................... 382/131
See application file for complete search history.

(56) References Cited

U.S. PATENT DOCUMENTS

| | | | |
|---|---|---|---|
| 6,018,562 | A | 1/2000 | Willson |
| 7,734,119 | B2 | 6/2010 | Cheryauka et al. |
| 8,571,287 | B2 | 10/2013 | De Man et al. |
| 8,660,328 | B2 | 2/2014 | Jarisch |
| 8,660,330 | B2 | 2/2014 | Jarisch |
| 8,897,528 | B2 | 11/2014 | Benson et al. |
| 8,923,583 | B2 | 12/2014 | Thibault et al. |
| 9,613,441 | B2* | 4/2017 | Koehler ............... G06T 11/006 |
| 2006/0072801 | A1 | 4/2006 | Bernard Deman et al. |
| 2008/0118020 | A1 | 5/2008 | Thibault et al. |
| 2010/0278413 | A1 | 11/2010 | Jarisch |
| 2014/0369580 | A1 | 12/2014 | Yu et al. |
| 2014/0369581 | A1 | 12/2014 | Fu et al. |

FOREIGN PATENT DOCUMENTS

| | | |
|---|---|---|
| WO | 2010/030750 A2 | 3/2010 |
| WO | 2013/116709 A8 | 8/2013 |

OTHER PUBLICATIONS

Dempster, et al., "Maximum Likelihood from Incomplete Data via the EM Algorithm," Journal of the Royal Statistical Society, Series B, vol. 39, No. 1, pp. 1-38, 1977 [Cited in Parent].

Elbakri, et al., "Segmentation-free statistical image reconstruction for polyenergetic x-ray computed tomography with experimental validation." Institute of Physics Publishing, Physics in Medicine and Biology 48, (2003), 2453-2477 [Cited in Parent].

Elbakri, et al., "Statistical Image Reconstruction for Polyenergetic X-Ray Computed Tomography." IEEE Transactions on Medical Imaging, vol. 21, No. 2, Feb. 2002, 89-99 [Cited in Parent].

Hsieh, et al., "Recent Advances in CT Image Reconstruction," Curr Radiol Rep, Springer Science+Business Media, Published online Jan. 16, 2013 [Cited in Parent].

Iwanczyk et al., "Photon Counting Energy Dispersive Detector Arrays for X-ray Imaging," IEEE Trans Nucl Sci. 2009; 56(3): 535-542 [Cited in Parent].

Kalke et al., "Sinogram Interpolation Method for Sparse-Angle Tomography," Applied Mathematics, vol. 5, published online Feb. 2014, Article ID:42776, 19 pages DOI:10.4236/am.2014.53043 [Cited in Parent].

Nikoukhah, et al., "Kalman Filtering and Riccati Equations for Descriptor Systems, Automatic Control," LIDS-P-2017, Jan. 1991 [Cited in Parent].

Paavolainen, et al., "Compensation of Missing Wedge Effects with Sequential Statistical Reconstruction in Electron Tomography," PLOS One. Oct. 2014, vol. 9, Issue 10, e108978 [Cited in Parent].

Schulze, et al., "Artefacts in CBCT: a review," Dentomaxillofacial Radiology, 2011, 40, 265-273, the British Institute of Radiology [Cited in Parent].

Schwarz, "Estimating the Dimension of a Model." the Annals of Statistics, vol. 6, No. 2, pp. 461-464, 1978 [Cited in Parent].

Staub, et al.,"4D Cone-beam CT reconstruction using a motion model based on principal component analysis," Medical Physics 38, vol. 12 (2011): 6697-6709 [Cited in Parent].

Sunnegardh, "Iterative Filtered Backprojection Methods for Helical Cone-Beam CT," Linkopings Studies in Science and Technology, Dissertation No. 1264, Linkopings University, SE-581 83 Linkoping, Sweden, Aug. 2009 [Cited in Parent].

Wood, et al., "A Fast Implementation of a Minimum Variance Estimator for Computerized Tomography Image Reconstruction," IEEE, Transactions on Biomedical Engineering, vol. BME-28, No. 2, Feb. 1981, pp. 56-68 [Cited in Parent].

Zhang-O'Connor et al., "Fourier-Based Forward and Back-Projectors in Iterative Fan-Beam Tomographic Image Reconstruction," IEEE Transactions on Medical Imaging, vol. 25, No. 5, May 2006, pp. 582-589 [Cited in Parent].

International Search Report and Written Opinion in International Applciation No. PCT/US17/62369, dated Jan. 30, 2018 [Cited in Parent].

Akaike, H., "Stochastic Theory of Minimal Realization." IEEE Trans. on Automatic Control, vol. AC-19, No. 6, pp. 667-674, Dec. 1974. [Cited in Parent].

Bar-Lev, S. K.; Enis, P., "On the classical choice of variance stabilizing transformations and an application for a Poisson variate", Biometrika 75 (4), pp. 803-804, 1988 [Cited in Parent].

Chen Jian-Lin, et al., Fast parallel algorithm for three-dimensional distance-driven model in iterative computed tomography reconstruction, Chin. Phys. B, vol. 24, No. 2 (2015) 028703; [Cited in Parent].

Choi, Ja-Yong Koo; Nam-Yong Lee, Image reconstruction using the wavelet transform for positron emission tomography, IEEE Trans. Med. Imag., vol. 20, No. 11, Nov. 2001; [Cited in Parent].

Huber, Peter, Robust Statistical Procedures, Society for Industrial and Appl. Math. vol. No. 27., Regional Conf. Series in Appl. Math., 1977; [Cited in Parent].

Huber, Peter, Robust Statistics, John Wiley, New York, 1981; [Cited in Parent].

Humphries, T. "Technical Note: Convergence analysis of a polyenergetic SART algorithm." Medical physics 42.7 (2015): 4007-4014. [Cited in Parent].

Humphries, T., and A. Faridani. "Reconstruction of CT Images from Sparse-View Polyenergetic Data Using Total Variation Minimization." 2015 IEEE Nuclear Science Symposium, San Diego, California. 2015. [Cited in Parent].

Levenberg, K., A Method for the Solution of Certain Non-Linear Problems in Least Squares, Quarterly of Applied Mathematics 2: 164-168, 1944; [Cited in Parent].

Long, Yong, Jeffrey A. Fessler, and James M. Baiter. "3D forward and back-projection for X-ray CT using separable footprints." IEEE transactions on medical imaging 29.11 (2010): 1839-1850. [Cited in Parent].

Marquardt, D., An Algorithm for Least-Squares Estimation of Nonlinear Parameters, SIAM Journal on Applied Mathematics 11 (2): 431-441, 1963; [Cited in Parent].

Meaney, Qianqian Fang, Tonny Rubaek, Eugene Demidenko, Keith D. Paulsen, Log transformation benefits parameter estimation in microwave tomographic imaging, Med. Phys. 34, 2014 (2007); [Cited in Parent].

Miao, Comparative Studies of Different System Models for Iterative CT Image Reconstruction, a Thesis Submitted to the Graduate Faculty of Wake Forest University Graduate School of Arts and Sciences, May 2013; [Cited in Parent].

Radon, J., "Uber die Bestimmung von Funktionen durch ihre Integralwerte langs gewisser Mannigfaltigkeiten," Berichte der Sächsischen Akademie der Wissenschaften, Mathematisch Physische Klasse, Leipzig, Germany, vol. 69, pp. 262-277, 1917). [Cited in Parent].

Sage, A.P., J.L. Melsa, Estimation Theory with Applications to Communications and Control, the Kalman Bucy Filter, New York: McGraw-Hill, 1971. ISBN-10: 0070544298, ISBN-13: 9780070544291. [Cited in Parent].

Solomon, Xiang Li, Ehsan Samei, Relating Noise to Image Quality Indicators in CT Examinations With Tube Current Modulation, Medical Physics and Informatics, American Roentgen Ray Society, AJR: 200, 592-600, Mar. 2013; [Cited in Parent].

Zeng, Gengsheng L., and Grant T. Gullberg. "Can the backprojection filtering algorithm be as accurate as the filtered backprojection algorithm?" Nuclear Science Symposium and Medical Imaging Conference, 1994., 1994 IEEE Conference Record. vol. 3. IEEE, 1994. [Cited in Parent].

(56) References Cited

OTHER PUBLICATIONS

Jarisch W.R., Curry M.J., Basser P.J., Extended High Efficiency Computed Tomography with Optimized Recursions, Microscopy and Microanalysis, vol. 24, Suppl., 2018. [Cited in Parent].

Jarisch W.R., Solomon W.H, 3D Tomography—Increased Accuracy and One to Two Orders of Magnitude Accelerated Reconstruction with eHECTOR—the New Extended High Efficiency Computed Tomography with Optimized Recursions, Microscopy and Microanalysis, vol. 24, Suppl., 2018. [Cited in Parent].

Chen B, Zhang Z, Sidky EY, Xia D, Pan X, Image reconstruction and scan configurations enabled by optimization-based algorithms in multispectral CT. Phys Med Biol. Nov. 2, 2017; 62(22):8763-8793 [Cited in Parent].

Ximin Shi, Nan Li, Haiyan Ding, Yonghong Dang, Guilan Hu,1 Shuai Liu, Jie Cui, Yue Zhang, Fang Li, Hui Zhang, and Li Huo, Comparison among Reconstruction Algorithms for Quantitative Analysis of 11C-Acetate Cardiac PET Imaging, Contrast Media & Molecular Imaging, vol. 2018 [Cited in Parent].

Cyril Mory, Bruno Sixou, Salim Si-Mohamed, Loic Boussel, Simon Rit. Comparison of five one-step reconstruction algorithms for spectral CT. 2018 [Cited in Parent].

Hilde Kjernlie Andersen, David Völgyes, and Anne Catrine Trægde Martinsena, Image quality with iterative reconstruction techniques in CT of the lungs—a phantom study, Eur J Radiol Open. 2018; 5: 35-40. Published online Mar. 8, 2018. doi: 10.1016/j.ejro.2018.02.002 [Cited in Parent].

Steven Tilley, Wojciech Zbijewski, Jeffrey H. Siewerdsen, and J. Webster Staymana, A General CT Reconstruction Algorithm for Model-Based Material Decomposition, Proc SPIE Int Soc Opt Eng. Mar. 2018; 10573: 105731E [Cited in Parent].

Bruno De Man, Member, IEEE, Samit Basu, Jean-Baptiste Thibault, Jiang Hsieh, Jeffrey A Fessler, Charles Bouman, and, Ken Sauer, "A study of four minimization approaches for iterative reconstruction in X-ray CT," 2005 IEEE Nuclear Science Symposium Conference Record, p. 2708-2710, 2005. [Cited in Parent].

Zhou Yu, Jean-Baptiste Thibault, Ken Sauer, Jaing Hsieh, "Edge-Localized Iterative Reconstruction for Computed Tomography," 10the Int. Meet. on Fully Three-Dim. Im. Reconstr. in Radiol. and Nucl. Med., p. 255-258, 2009.[Cited in Parent].

Xiao Wang, Amit Sabne, Sherman Kisner, Anand Raghunathan, Charles Bouman, Samual Midkiff, "High performance model based image reconstruction," PPoPP '16 Proceedings of the 21st ACM Sigplan Symposium on Principles and Practice of Parallel Programming, Article No. 2, Barcelona, Spain—Mar. 12-16, 2016.[Cited in Parent].

Zhanli Hu, Juan Gao, Na Zhang, Yongfeng Yang, Xin Liu, Hairong Zheng & Dong Liang, "An improved statistical iterative algorithm for sparse-view and limited-angle CT image reconstruction," Scientific Reports, vol. 7, Article No. 10747, Sep. 6, 2017. [Cited in Parent].

Lorenz Hehn, Kaye Morgan, Pidassa Bidola, Wolfgang Noichl, Regine Gradl, Martin Dierolf, Peter B. Noel, and Franz Pfeiffer, "Nonlinear statistical iterative reconstruction for propagation-based phase-contrast tomography," APL Bioengineering 2, 016105, 2018. [Cited in Parent].

Biguri, Ander, "Iterative GPU-based Reconstruction Toolbox," European Organization for Nuclear Research, TIGRE: Tomographic Iterative GPU-based Reconstruction Toolbox, https://github.com/CERN/TIGRE, accessed Oct. 24, 2019. [Cited in Parent].

Biguri, Ander, "Iterative Reconstruction and Motion compensation in Computed Tomography on GPUs," PhD Thesis by Ander Biguri, University of Bath, Apr. 2018. [Cited in Parent].

Notification of Reasons for Rejection issued in counterpart Japanese Patent Application No. 2019-525981 dated Apr. 14, 2020.

Extended European Search Report issued in counterpart European Patent Application No. 17872842.4 dated May 11, 2020.

N. Rajeevan et al., "Vector-Extrapolated Fast Maximum Likelihood Estimation Algorithms for Emission Tomography," IEEE Transactions on Medical Imaging, IEEE Service Center, Piscataway, NJ, US, vol. 11, No. 1, Mar. 1, 1992, pp. 9-20.

\* cited by examiner

EXTENDED HIGH EFFICIENCY COMPUTED TOMOGRAPHY WITH OPTIMIZED RECURSIONS AND APPLICATIONS

CROSS-REFERENCE OF RELATED APPLICATIONS

This patent application claims priority of U.S. Patent Application No. 62/424,187, filed on Nov. 18, 2016, and U.S. Patent Application No. 62/426,065, filed on Nov. 23, 2016, and the entire contents of both are hereby incorporated by reference.

FIELD OF INVENTION

The invention relates to the field of image reconstruction.

BACKGROUND OF INVENTION

Tomography, the computation (estimation) of densities (represented as voxels) in a region of n-dimensional space based on m-dimensional projections of that region (represented as pixels; usually 0<m<n), falls into two major categories: linear filtered back-projection (FBP) and fast Fourier transform (FFT) methods and modern non-linear iterative reconstruction (IR), such as the Algebraic Reconstruction Technique (ART), the Simultaneous Iterative Algebraic Reconstruction Technique (SIRT and SART), and the Model Based Iterative Reconstruction (MBIR). Image reconstruction from modern tomography settings, however, is typically complex due to the use of non-linear estimation. Tomographic settings often require $10^6$-$10^{10}$ image elements (i.e., voxels) to be computed when one projection contains anywhere from 2,000 pixels (one-dimensional) to 4,000×4,000 pixels (two-dimensional).

Major deficiencies associated with FBP include the need for a large number of projections to achieve limited quantitative accuracy. The number of projections is typically counted in the hundreds or thousands but the projections are not used as efficiently as they could be.

The benefits of IR techniques include their ability to reduce reconstruction errors when following FBP. An overview of related processing techniques and their particular benefits, especially linear and robust techniques, is presented in Sunnegardh [15]. Additionally, IR can account for constraints, especially the ability to assure density estimates to be non-negative. Finding the optimal object reconstruction requires the minimization of the objective function, which is the sum of all reconstruction errors. Finding the optimal reconstruction requires operations on each voxel. Near the minimum error the objective function can typically be represented by the Hessian matrix, describing the second derivative of the objective function. In tomography, for a three-dimensional volume of 1,000 voxels or more in any one dimension, equivalent to $1,000 \times 1,000 \times 1,000 = 10^9$ voxels or more, this Hessian may contain $10^9 \times 10^9 = 10^{18}$ or more elements. Storing and manipulating such a large number of elements, however, is out of reach for present computers, and for systems in the foreseeable future.

To date, all commercial IR systems performance has been restrained by the properties of this Hessian matrix. Iterations, using quasi-Newton methods, bypass the evaluation of the Hessian matrix. For these methods, the tendency is to identify minimization steps that cope with the largest eigenvalues of the Hessian. For this purpose, an initial FBP is followed up by iterative refinement. Due to the large size of the Hessian matrix for image reconstruction, however, its structure (and that of its inverse) are typically ignored or poorly approximated during the refinement. Furthermore, because of the wide distribution of eigen-values of the Hessian, current optimization techniques tend to show no improvement beyond a number of iterations (typically counted in the tens-to-thousands) and may only cope with few of the large eigenvalues.

Multi-grid variations of these algorithms may help, but ultimately still fail because of the size of the Hessians involved with fine grids. Multi-grid resolution here refers to the use of progressively finer resolution as iterations are performed.

Further, systems uncertainties in tens or hundreds of systems parameters, characterizing, for example, object deformation, beam hardening and scatter in the case of x-ray imaging, or field distortions in the case of magnetic resonance imaging (MRI), may also increase measurement data inconsistencies.

SUMMARY

A system according to some embodiments of the invention comprises: a non-transitory data storage for storing projection space data, the projection space data in a density domain for an object under observation, and including one or more input projection pixels and one or more predicted projection space pixels; and an image reconstructor computer having at least one processor, the at least one processor operable to: receive the projection space data in the density domain from the non-transitory data storage; compute one or more measured transformed pixels in a transformed domain using the one or more input projection pixels in the density domain and input transformation functions; compute one or more predicted transformed pixels in the transformed domain using the one or more predicted projection space pixels in the density domain and reference transformation functions; compute first pixel innovation result data in the transformed domain using a difference between the one or more measured transformed pixels and the one or more predicted transformed pixels; compute a pixel-by-pixel innovation scaling matrix using inverse slopes of the input transformation functions and inverse slopes of the reference transformation functions for corresponding input and reference pixel values; compute second pixel innovation result data using a pixel-by-pixel product of the first pixel innovation result data and corresponding elements of the pixel-by-pixel innovation scaling matrix; compute preliminary transformed object update data using a tomographic reconstruction algorithm and based on the second pixel innovation result data; compute a transformed object voxel density update estimate by scaling the preliminary transformed object update data with the corresponding elements of a voxel-by-voxel update scaling matrix, wherein at least one voxel of the transformed object voxel density update estimate is associated with an element of the voxel-by-voxel update scaling matrix; add the transformed object voxel density update estimate to a corresponding transformed preceding voxel data estimate to obtain a transformed density estimate; and reconstruct an object space image representing the object under observation using the transformed density estimate.

According to some embodiments of the invention, a non-transitory data storage device stores software code executable by a computer having one or more processors, the software code to: receive projection space data in a density domain for an object under observation, the projection space data including one or more input projection pixels and one or more predicted projection space pixels; compute one or more measured transformed pixels in a transformed domain using the one or more input projection pixels in the density domain and input transformation functions; compute one or more predicted transformed pixels in the transformed domain using the one or more predicted projection space pixels in the density domain and reference transformation functions; compute first pixel innovation result data in the transformed domain using a difference between the one or more measured transformed pixels and the one or more predicted transformed pixels; compute a pixel-by-pixel innovation scaling matrix using inverse slopes of the input transformation functions and inverse slopes of the reference transformation functions for corresponding input and reference pixel values; compute second pixel innovation result data using a pixel-by-pixel product of the first pixel innovation result data and corresponding elements of the pixel-by-pixel innovation scaling matrix; compute preliminary transformed object update data using a tomographic reconstruction algorithm and based on the second pixel innovation result data; compute a transformed object voxel density update estimate by scaling the preliminary transformed object update data with the corresponding elements of a voxel-by-voxel update scaling matrix, wherein at least one voxel of the transformed object voxel density update estimate is associated with an element of the voxel-by-voxel update scaling matrix; add the transformed object voxel density update estimate to a corresponding transformed preceding voxel data estimate to obtain a transformed density estimate; and reconstruct an object space image representing the object under observation using the transformed density estimate.

According to some embodiments of the invention, a method for image reconstruction performed by an image reconstructor computer having at least one processor comprises: receiving projection space data in a density domain for an object under observation, the projection space data including one or more input projection pixels and one or more predicted projection space pixels; computing one or more measured transformed pixels in a transformed domain using the one or more input projection pixels in the density domain and input transformation functions; computing one or more predicted transformed pixels in the transformed domain using the one or more predicted projection space pixels in the density domain and reference transformation functions; computing first pixel innovation result data in the transformed domain using a difference between the one or more measured transformed pixels and the one or more predicted transformed pixels; computing a pixel-by-pixel innovation scaling matrix using inverse slopes of the input transformation functions and inverse slopes of the reference transformation functions for corresponding input and reference pixel values; computing second pixel innovation result data using a pixel-by-pixel product of the first pixel innovation result data and corresponding elements of the pixel-by-pixel innovation scaling matrix; computing preliminary transformed object update data using a tomographic reconstruction algorithm and based on the second pixel innovation result data; computing a transformed object voxel density update estimate by scaling the preliminary transformed object update data with the corresponding elements of a voxel-by-voxel update scaling matrix, wherein at least one voxel of the transformed object voxel density update estimate is associated with an element of the voxel-by-voxel update scaling matrix; adding the transformed object voxel density update estimate to a corresponding transformed preceding voxel data estimate to obtain a transformed density estimate; and reconstructing an object space image representing the object under observation using the transformed density estimate.

BRIEF DESCRIPTION OF THE DRAWINGS

Exemplary embodiments will now be described in connection with the associated drawings. The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Exemplary embodiments of the invention are discussed in detail below. In describing exemplary embodiments, specific terminology is employed for the sake of clarity. However, the invention is not intended to be limited to the specific terminology so selected. A person skilled in the relevant art will recognize that other equivalent components may be employed and other methods developed without departing from the broad concepts of the invention. All references cited herein are incorporated by reference as if each had been individually incorporated.

The inventor has discovered an approximation technique of small signal linearization and simplification of sub-problems to make the computations of extended high efficiency computed tomography with optimized recursions efficient.

Techniques and systems described herein may enhance known existing techniques, for example, those described in U.S. Pat. Nos. 8,660,328 and 8,660,330.

Figure 1:
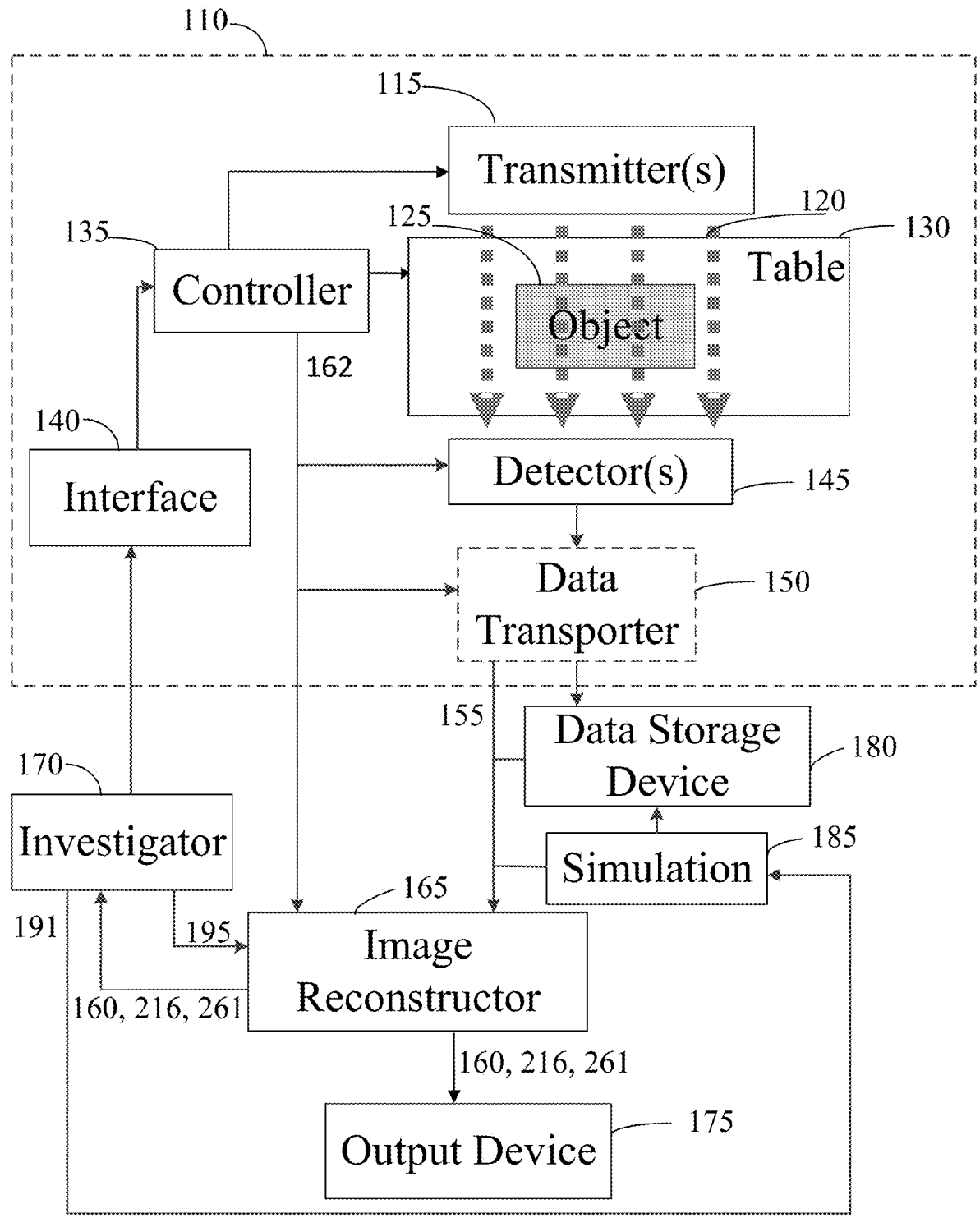
FIG. 1 depicts an imaging system according to an exemplary embodiment of the invention.

FIG. 1 depicts an imaging system according to an exemplary embodiment of the invention. The imaging system may include: a controller 135; an interface 140 (e.g. a graphic user interface, keyboard, joystick, etc.) for signal communication with an investigator 170 (e.g., a computer) and synchronization with the controller 135; transmitter(s) 115 for generating and emitting excitation energy 120 in response to a control signal from the controller 135; and detector(s) 145 configured to generate measured pixel data 155. The measured pixel data 155 may be in a digital format stored in a data storage device 180.

Measured pixel data 155 containing information encoding the internal structure of an object 125 may be transformed using image reconstructor 165 (e.g., a computer) into a reconstructed image data 261 to be visualized on an output device 175, for example. The measured pixel data 155 may be from an experimental acquisition 110, a simulation 185 (e.g., on a computer), and/or a data storage device 180 containing recorded projected pixel data from an earlier experiment or simulation, for example. The experimental acquisition 110, data storage device 180, and simulation 185 may remotely provide the measured pixel data 155 to the image reconstructor 165 directly or via a network, for example, a local area network (LAN), a wide area network (WAN), the Internet, etc. Measured pixel data 155 may include the result of delivering any form of excitation energy into an object under observation 125 and thus may include data from, for example, electron microscopy, magnetic resonance (MR), positron emission tomography (PET), single positron emission computed tomography (SPECT), ultrasound, fluorescence, multi-photon microscopy (MPM), optical coherence tomography (OCT), computed tomography (CT), electromagnetic (EM) energy, X-Ray energy, particle beams, infra-red energy, optical energy, and/or vibration energy projection acquisition processes, etc., in addition to x-ray computed tomography (CT). Data storage device 180 may be, for example, non-transitory memory, CD-ROM, DVD, magneto-optical (MO) disk, hard disk, floppy disk, zip-disk, flash-drive, cloud data storage, etc. Measured pixel data 155 from experimental acquisition 110 and/or simulation 185 may be stored on data storage device 180.

The imaging system may also include: a translating or rotating table 130 configured for receiving an object 125 thereon and operable to translate or rotate in relation to the transmitter(s) 115 and the detector(s) 145; and an image reconstructor 165 coupled electrically, or via an optional data transporter 150, such as the Internet, other networks, or a data bus, to the detector(s) 145 and the controller 135. A data bus, may be, for example, a subsystem of electrical wires that transfers data between computer components inside a computer or between computers. Although the data flow between connected components is uni-directional, the communication between connected components may be bi-directional.

Excitation energy 120 may be a form of radiation energy such as, for example, X-ray energy, electromagnetic (EM) energy, optical energy, infra-red (IR) energy, particle energy (e.g., electron, neutron, atom beams), vibration energy, such as ultrasound, etc. Excitation energy 120 may be irradiated onto an object 125, which may be, for example, a phantom, a human patient, a specimen, or any combination thereof. The excitation energy 120 may be emitted by transmitter(s) 115 of the corresponding energy type. The excitation energy 120 may propagate through the object 125 and a portion may be received by the appropriate detector(s) 145. The detector(s) 145 may convert received energy into measurable electrical signals that may be further convert the measured electrical signals into projected pixel data in a digital format.

Controller 135 may be a circuit connecting the transmitter(s) 115 and detector(s) 145 and may send control signals to the transmitter(s) 115 and detector(s) 145 to synchronize the transmission of the excitation energy 120 and the operation of the detector(s) 145. The circuit may be analog, digital, or mixed-signal. Controller 135 may also be a computer having one more processors and one or more memories to send control signals to the transmitter(s) 115 and detector(s) 145.

The image reconstructor 165 may be responsive to the controller 135 and receptive of the measured pixel data 155 to reconstruct an image of the object 125 via a method according to some embodiments of the invention to produce a high fidelity image of the object with high computation efficiency. The image reconstructor 165 may be, for example, a computer having one or more data storage devices storing software code to operate the computer according to the exemplary embodiments of the invention. The computer may include one or more processors and non-transitory computer-readable medium to read and execute the software code stored on the one or more data storage devices. In another exemplary embodiment, the image reconstructor 165 may include one or more program storage and execution devices operable according to the exemplary embodiments of the invention. The image reconstructor 165 may produce the reconstructed image data 261. The image reconstructor 165 may receive the measured pixel data 155 and may process the measured pixel data 155 by, for example, nonlinear transformation 200 to generate cumulative object density projection data 201, further computing measured transformed pixels 206, the nonlinear transformations of projection data 201, and computing their excess over predicted transformed pixel data 211, to generate innovations, to produce reconstructed image data 261, and may further generate, for example, predicted projection data 276 in FIG. 2.

An output device 175 may receive one or more of the reconstructed image data 261, reconstructed image error data 160, or reconstruction image error data 216. Output device 175 may be a visualization device or a data storage device, for example. A visualization device may be, for example, a display device or a printing device. Example display devices may include, for example, a cathode ray tube (CRT), a light-emitting diode (LED) display, a liquid crystal display (LCD), a digital light projection (DLP) monitor, a vacuum florescent display (VFDs), a surface-conduction electron-emitter display (SED), a field emission display (FEDs), a liquid crystal on silicon (LCOS) display, etc. Example printing devices may include, for example, toner-based printers, liquid ink-jet printers, solid ink printers, dye-sublimation printers, and inkless printers such as thermal printers and ultraviolet (UV) printers, etc. The printing device may print in three dimensions (3-D). Output device 175 may receive the object space image information representing the object under observation 125. The output device 175 may include, for example, a data storage device, a display device, a printing device, or another computer system.

The imaging system may further include investigator 170. Investigator 170 may be a programmed computer, may receive one or more of the reconstructed image data 261, reconstructed image error data 160, or reconstruction image error data 216, and then apply an algorithm (e.g., pre-programmed routine, artificial intelligence, machine learning, etc.) to extract diagnostic information about the object 125 or to fine-tune control parameters for transmitter(s) 115, detector(s) 145, table 130, image reconstructor 165, etc. In some embodiments, the interface 140 or the output device 175 may not be necessary. In some embodiments, the investigator 170, the controller 135, and the image reconstructor 165 may reside on the same computer or separate computers. Investigator 170 may receive the data 261, 160, or 216 and may be programmed to perform extraction of diagnostic information from the data or to fine tune parameters for processing, for example, at least one of the one or more density domain input pixel, projection directions, projection deformations, projection generation systems process such as focal spot size, etc., or the image reconstructor 165. The investigator 170 is also referred to herein as an "investigator computer."

Some embodiments of the invention may provide a workstation comprising one or more processors configured to reconstruct an image in a manner similar to image reconstructor 165. The workstation may receive input data from at least one of an imaging system, a data storage device, or a computer. The input data may be received via a data bus, a cable, a wired network, a wireless network, etc. The workstation may further comprise an output device 175 to receive the reconstructed image. The output device may be a data storage device, a display device, a printing device, etc. Example data storage devices, display devices, and printing devices are as discussed above.

Figure 2A:
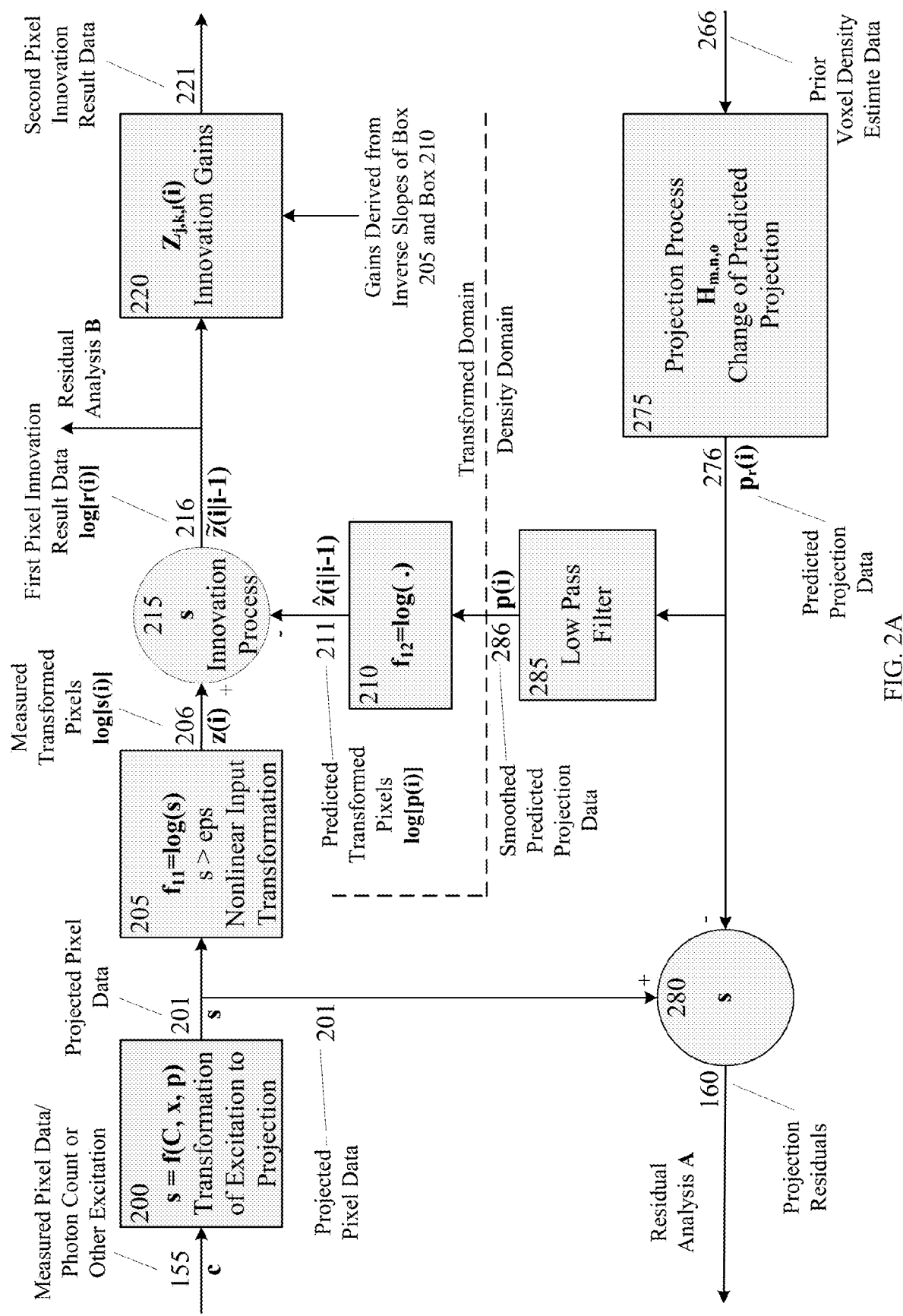
FIGS. 2A and 2B (collectively FIG. 2) depict example data input, reference prediction, and inner feedback loop 165 of enhanced high efficiency computer tomography (CT) with optimized recursions with reconstructed object density according to an exemplary embodiment at iteration i.
Figure 2B:
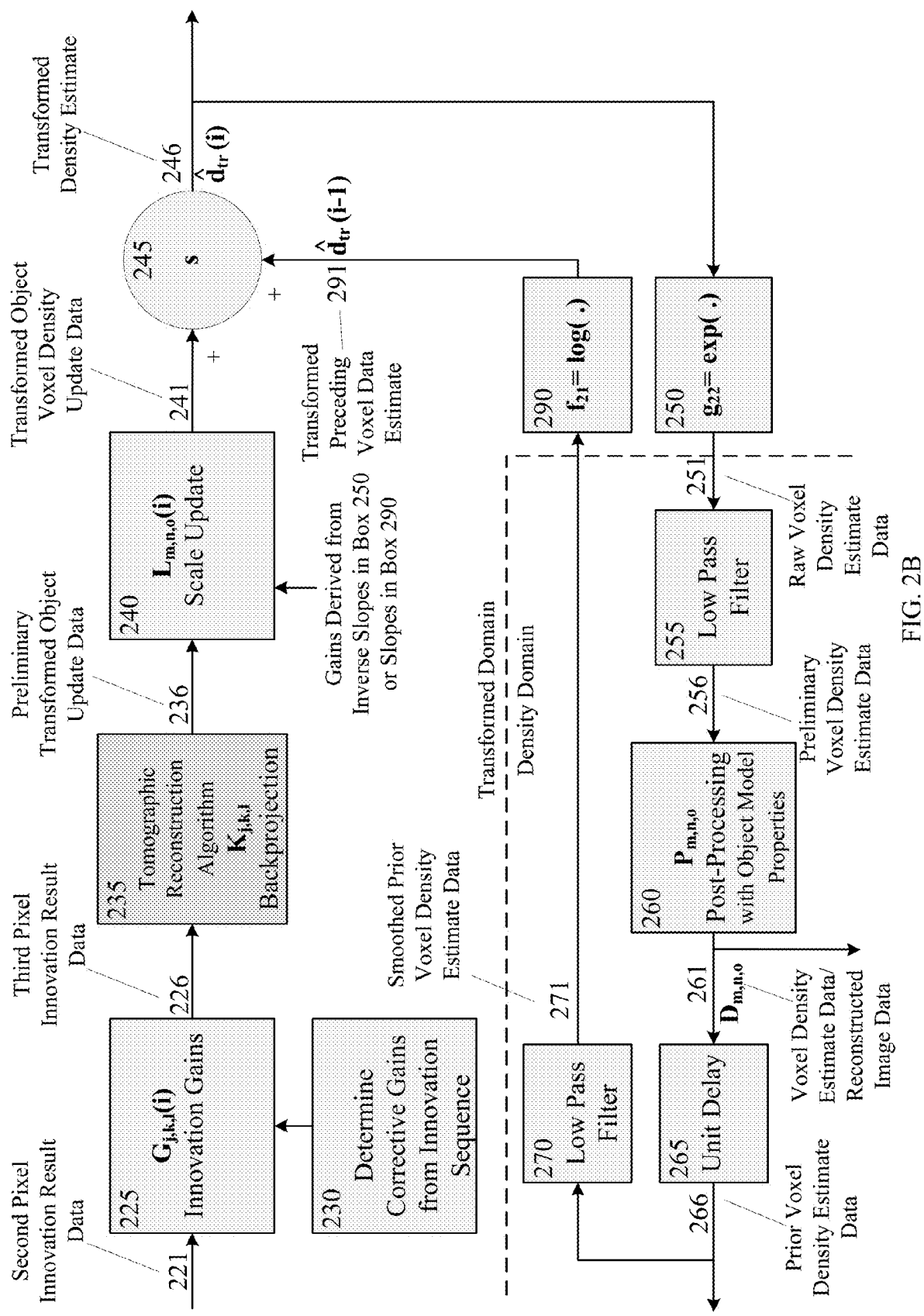

FIG. 2 shows a systematic chart according to an embodiment. In particular, FIG. 2A depicts an example raw measurement data input 155, using transformation 200 to compute projection space density data 201 from raw measurements, transformation 205 to obtain transformed projection data 206, and reference transformed prediction 211 using filter 285, together with a projection 276 of the preceding estimated object density 261 for enhanced high efficiency CT with optimized recursions. Innovation gain adjustments 220 and 225 form a bridge between FIG. 2A and FIG. 2B. FIG. 2B depicts an example forward processing and scaled inversion of the enhanced high efficiency CT with optimized recursions together with the feedback section to obtain the voxel density estimate data 261. Some, but not all transformations in above processing may be linear, in contrast to the assumptions in Sunnegardh [15].

In an embodiment, an invention described herein may include one or more transmitters 115 to transmit an excitation energy 120 into an object under observation 125; one or more detectors 145 to generate projection space data encoding an energy received by the one or more detectors 145 in response to the transmitted excitation energy 120 into the object under observation 125; a controller 135 to control the one or more transmitters 115 to transmit the excitation energy 120 and the one or more detectors 145 to generate the projection space data 155; and an image reconstructor 165 having at least one processor to receive the projection space data 155 and to process the projection space data 155 by, for example, the process depicted in FIG. 2 and explained herein.

According to some embodiments, the image reconstructor 165 may: compute projection values for sets of voxels; compute back-projection values for sets of pixels; compute remaining pixels and voxels using other sources of information; and use or build functional relationships among voxels and pixels, such as a priori known high density voxel of a particular object and corresponding expected projection ranges among pixels, or voxels and corresponding missing projection measurements. For example, when some projection values are missing, such as in the missing wedge problem, L. Paavolainen et al. [16], or sparse projections, predictions may be used to replace (expected) missing pixel measurements, using the method of expectation maximization (EM), described in Dempster et al. [17].

The EM method represents the case of missing data, equivalent to infinite observation noise. Data regarded less reliable (DRLR) in some areas of the image, may equivalently be expressed as data with increased observation noise, rather than infinite observation noise. Using all available data, including the DRLR, data in these areas may very efficiently be re-computed/estimated with the EM method, producing re-computed/corrected EM data (REMD). A weighted combination of the DRLR and the REMD may then be used as input values for the next process iteration, resolving the issue of data weighing dependent on data reliability. Relative weighting may, for example, be based on combined noise levels. As such, the image reconstructor 165 may re-compute or correct a portion of the at least one unreliable data or missing measurement data using weighted predicted projection data 276.

An embodiment of the invention may also include, for example, a workstation including one or more processors; and one or more non-transitory data storage devices 180 storing software to be executed by the one or more processors, the software may include software code to implement the process depicted in FIG. 2 and explained herein.

An embodiment of the invention may also provide a method implemented by one or more processors executing software code stored on one or more data storage devices 180, the method comprising steps to implement the process depicted in FIG. 2 and explained herein.

For example, the image reconstructor 165 may process the projection space data by the following, or the software may include software code to perform the following, or the method may include steps for the following: transforming the projection space data 155 to obtain projected pixel data 201; nonlinearly transforming the projected pixel data 201 to obtain measured transformed pixel data 206; computing a first pixel innovation result data 216 characterizing a difference between the measured transformed pixel data 206 and predicted transformed pixel data 211; recording the first pixel innovation result data 216 in a data storage device 180; computing a second pixel innovation result data 221, wherein the first pixel innovation result data 216 is re-scaled based on inverses of slopes of two sets of non-linear transformations 205 and 210; computing a third pixel innovation result data 226 based on the second pixel innovation result data 221 from preceding iterations; approximately inverting second pixel innovation result data 221 using a tomographic reconstruction algorithm to obtain preliminary transformed object density update data 236; computing transformed object voxel density update data 241 by re-scaling the preliminary transformed object density update data 236 using slopes derived from the set of non-linear transformations 290 of voxel densities and inverse slopes of the set of non-linear back-transformations 250; accumulating the transformed object voxel density update data 241 with the preceding voxel data estimate 291 from the preceding iteration to form the transformed object voxel density estimate 246; computing raw voxel density data 251 by transforming the transformed object voxel density estimate 246; smoothing the raw voxel density data 251 with a low-pass filter to obtain preliminary voxel density estimate data 256; computing voxel density estimate data 261 by re-estimating the preliminary voxel density estimate data 256 using object structural information; storing the voxel density estimate data 261 in the data storage device 180; delaying the voxel density estimate data 261 by a unit delay to obtain prior voxel density estimate data 266; smoothing the prior voxel density estimate data 266 with a low-pass filter to obtain smoothed prior voxel density estimate data 271; transforming the smoothed prior voxel density estimate data 271 to obtain the preceding voxel data estimate data 291; computing predicted projection data 276 from the prior voxel density estimate data 266 using a tomographic projection algorithm; smoothing the predicted projection data 276 with a low-pass filter 285 to obtain smoothed predicted projection data 286; transforming the smoothed predicted projection data 286 to obtain the predicted transformed pixel data 211; determining reconstructed image error data 160 by comparing the predicted projection data 276 and the projected pixel data 201; and storing the reconstructed image error data 160 in the data storage device 180.

In the description of the embodiments of the invention, as well as in FIG. 2A and FIG. 2B, the projection space data 155 is also referred to as "measured pixel data 155," "object imaging data," "raw measurement data input 155," and "input data 155."

The reconstructed image error data 160 is also referred to as "residual data 160," "projection residuals 160," "image data residuals 160," "innovation residuals 160," "data 160," and "residual set 160."

The image reconstructor 165 is also referred to herein as "inner feedback loop 165" and "image reconstructor computer."

The projected pixel data 201, produced by the cumulative object voxel density along a projection direction using a transformation in box 200, is also referred to herein as "projected integral object density 201," "projection space density data 201," "input signal data 201," "approximate projection data," "input data 201," "projections 201," "data 201," "projection data pixels set s(i) 201," and "input projections pixels."

The transformation 205 is also be referred to herein as "input transformation functions." The input transformation functions (or input transformation function) 205 may be linear or non-linear.

The measured transformed pixel data 206 is also referred to herein as "measured transformed pixels 206," "pixel data 206," "transformed integral projected object density 206," "transformed projection data 206," "innovation data 206," and "transformed projected object density 206."

The transformation 210 is also be referred to herein as "reference transformation functions." The reference transformation functions (or reference transformation function) 210 may be linear or non-linear.

The predicted transformed pixel data 211 is also referred to herein as "transformed prediction 211," "predicted data 211," "predicted transformed pixels 211," and "transformed prediction data 211."

The first pixel innovation result data 216 is also referred to herein as "reconstruction image error data 216," "image error data 216," "image data residuals 216," "innovation residuals 216," "data 216," "innovations 216," "innovation data 216," "residual data 216," and "residuals 216."

The second pixel innovation result data 221 is also referred to herein as "error data 221," "innovation data 221," "innovation residuals 221," and "data 221."

The third pixel innovation result data 226 is also referred to herein as "innovation residuals 226," "data 226," and "innovation data 226."

The preliminary voxel update data 236 is also referred to herein as "preliminary transformed object density update data 236," "preliminary update data 236," and "preliminary transformed object update data."

The transformed object voxel density update data 241 is also referred to herein as "update data 241."

The transformed object voxel density update estimate 246 is also referred to herein as "transformed density estimate 246," "transformed voxel density estimate 246," and "data 246."

The raw voxel density data 251 is also referred to herein as "raw voxel density estimate data 251."

The reconstructed image data 261 is also referred to herein as "data 261," "estimated object density 261," "voxel density estimate data 261," "object density data 261," "reconstructed object 261," "object data 261," "object space image," and "image data 261."

Mismatch between a known reference model and the computed object density 261 is referred to as MMR-261.

The projection 276 is also referred to herein as "predicted projection data 276," "predicted space data 276," "predicted projection space pixels 276," "data 276," and "predicted feedback measurement pixels 276."

The smoothed predicted projection data 286 may also be referred to herein as "data 286."

The high processing performance in the image reconstructor 165, shown in FIG. 2A and FIG. 2B, may be summarized as the following three step process.

First, within the feedback loop, a feed forward data inversion processing section from projected pixel data 201 to voxel density estimate data 261 that may use data processing linearization at some processing steps allowing efficient use of linear inversion tomographic techniques to capture, ideally, all object related spatial frequency components. Nonlinear transformations, allowing computation of small signal voxel gain coefficients, and intermediate transformed object voxel density estimate 246 in order to achieve positive voxel density estimate data 261, are included.

Second, a feedback loop data projection section computing positive object voxel density estimate data 261 to generate positive predicted projection data 276. Projection predictor component H, which accounts for the quality of reconstruction by approximating the corresponding object imaging process beginning with the transmitters 115 to data 201, computes an approximation of the object projection process. Optimization with every iteration is highly efficient and based on theoretical properties of the feedback loop rather than on numerical hill-climbing.

Third, in order to better approximate unknown systems characteristics, a set of parameters contained in a vector p, representing uncertainties in an image acquisition system, may be chosen and adjusted to correct the effect of these uncertainties. For example, uncertainties in the computation of expected scatter or beam hardening, initially not accounted for by a simple log-transformation of measured x-ray intensity to estimate the projected object density, may be accounted and adjusted for by computing a corrected vector parameter p. The vector parameter p is also referred to herein as "parameter vector p." The adjustments of components of p may, for example, change the base of the logarithmic transformation to account for beam hardening for given object data, applying corrections in the measurement data pre-processing 200, and change the predicted signal intensity data values to account for x-ray scatter using 200 and 275. The performance measure may be derived from at least one of a first innovation process 216, projection residuals 160, or expected values of object data of the image reconstructor computer for a fixed set of fixed externally controllable parameter components.

Similarly, for example, in radial compressed sensing (CS) magnetic resonance imaging (MRI), quantitatively insufficiently represented, case specific, physical data acquisition and processing characteristics may be included and corrections computed in vector parameter p. This correction process may occur in the feedback section of the loop taking object density data 261 to predicted projection data 276. This process is to duplicate the effect of data 115, transfer object imaging data 155 to box 200 to produce approximate projection data 201. Representation of the data acquisition processes and adjusting corresponding unknown parameters in vector p in the feedback section of the loop, allows efficient and accurate adjustment of the unknown parameters in vector p. The effect of changing parameters may be expressed, for example in part, in the coefficients in projection matrix H in box 275.

Figure 4:
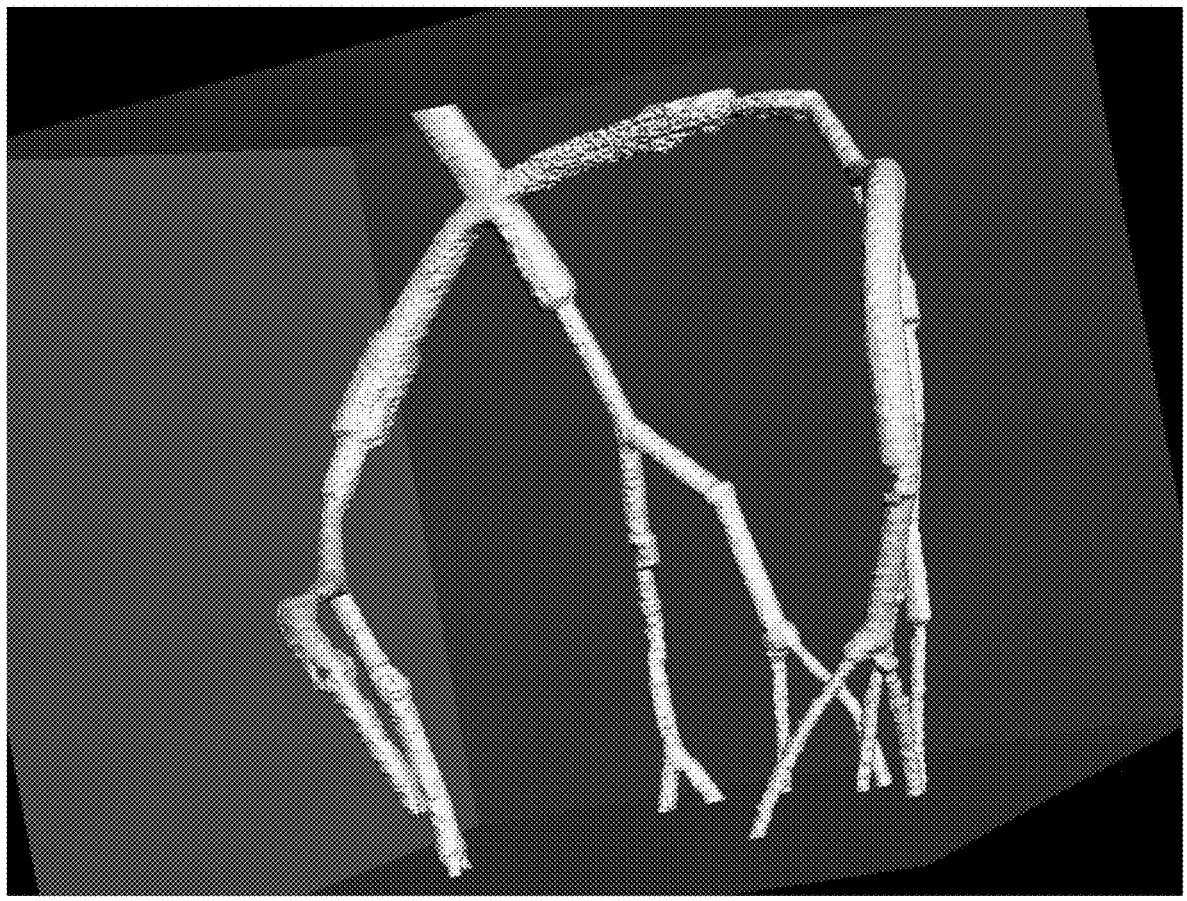
FIG. 4 depicts a reconstruction of a beating hydraulic coronary tree model from six projections according to an exemplary embodiment of the Levenberg-Marquardt process applied to 3D cone beam reconstruction.

Using increasing grid resolutions and fixed parameters in vector parameter p for the image reconstructor 165 with iterations for the processes from measured pixel data 155 to predicted data 211, reconstruction times for image data 261 near that of FBP can be achieved. With this speed, the iterative refinement of systems parameters contained in p becomes feasible. For example, image data residuals 160 or 216 are sent to the investigator 170. Using, for example, minimization of the sum-of-squares of image data residuals 160, 216, and, when available, errors between known object and computed object data, the investigator 170 may compute corrected values of parameters in p, using, for example, the highly efficient Levenberg-Marquardt process. The Levenberg-Marquardt method is typically by a factor k or more times as fast as steepest descent and related approaches, used by others (where k is the number of unknowns to be adjusted). Refined parameters in p are provided back to the image reconstructor 165. Iterating this second layer of data processing applied to p leads to greatly improved object data 261. An example of a result of this process is shown in FIG. 4.

In one embodiment, FIG. 2 may include the functionality of image reconstructor 165. For example, measured pixel data 155 of FIG. 1 may be supplied as input as shown in FIG. 2. Measured pixel data 155 may be from experimental acquisition 110, simulation 185, or data storage device 180 containing recorded projected pixel data from an earlier experiment or simulation or other data source. Measured pixel data 155 may be provided to the image reconstructor 165 directly or remotely via a network, for example, a local area network (LAN), a wide area network (WAN), the Internet etc. In one embodiment, image reconstructor 165 may process measured pixel data 155 to produce reconstructed object 261. In box 200, measured pixel data 155 is processed to obtain projected pixel data 201. The measured pixel data 155 is processed by a transformation that may support the accuracy of subsequent data processing approximations. For example, in x-ray imaging the photon intensity may be transformed by the negative logarithm in order to obtain as a preliminary approximation of an estimate of the corresponding object density projection. It may, for example, contain further refining transformations expressed in components of the parameter vector p that adjust estimates of the projection density for the effects of beam hardening, scatter, or defects of the image recording system, reducing the need to estimate these refinements within 275. In radial scanning (RS) compressed sensing (CS) MRI, box 200 may use Fourier transformation or principal component methods to convert the measured pixel data 155 into a preliminary approximation of the object density projection space density data, and box 200 may, for example, contain further refining transformations expressed in the parameter vector p that adjust for geometric field distortions and deviations from designed excitation and response measurement conditions. The particulars of the transformation process in box 200 may be adapted to approximate any given physical imaging process used to obtain an approximate object density projection density.

Another way to understand the processing in the image reconstructor 165, shown in FIG. 2A and FIG. 2B, may be summarized as follows. At least a matrix Z (box 220) or a matrix L (box 240) may be determined and used for processing the state data 201 (e.g., the matrix Z (box 220) to obtain transformed pixel innovations 221, or the matrix L (box 240) to obtain voxel updates 241) using the expected state data 276, where the processing depends on the expected state data 276, the function sets of $f_{11}$ (box 205) and $f_{12}$ (box 210) to determine the matrix Z (box 220), and the function sets of $f_2$ (box 290) and $g_{22}$ (box 250) to determine the matrix L (box 240).

In box 205, projected pixel data 201 containing information encoding the internal structure of an object may be non-linearly (or linearly) transformed into pixel data 206. In box 205, a usually nonlinear input transformation matrix using elements $f_{11}$ (where, for example, $f_{11}(s)=\log(s)$ and for all pixel values $s > s_o >$ eps, respectively $f_{11}(s_o) > c_{min}$ for each pixel) may be used pixel-by-pixel to compute one or more measured transformed pixel values 206 in the transformed domain (where, for example, $f_{11}$ may also be a function of a parameter, expressing, for example, beam hardening). In box 205, the data is transformed from the density domain to the transformed domain. In another embodiment, $f_{11}$ may be computed in box 205 as an approximately variance stabilizing function of the input data 201. For example, $f_{11}$ in box 205, may be approximately the Poisson variance stabilizing square-root function of the input signal data 201 obtained from PET measurements. As another example, $f_{11}$ may be a linear function or a set of linear functions, for example, when the measurement noise is constant.

In box 210, predicted projection data 276 may be transformed into one or more predicted transformed pixels 211 using nonlinear (or linear) reference transformation $f_{12}$ pixel-by-pixel. For example, when using a nonlinear reference transformation $f_{12}$ may be the logarithm function (e.g., $f_{12}=\log(.)$). As used herein, "pixel" may refer to the location of the pixel or the value of the pixel. Similarly, as used herein, "voxel" may refer to the location of the voxel or the value of the voxel. In box 210, the data is transformed from the density domain to the transformed domain. The nonlinear (or linear) reference transformation $f_{12}$ may use one or more predicted projection space pixels 276 (or smoothed predicted projection data 286 when smoothed by a filter (such as a low pass filter) in box 285) from the density domain to compute one or more predicted transformed pixels 211 in the transformed domain. The, for example, two-dimensional smoothing characteristics, in box 285 on a projection 276 of an object are an approximation to the effect of the projection when smoothing the same object data with a filter 270 in, for example, three dimensions. This concept also applies to higher dimensional reconstructions. In other words, the linear operations of projection and smoothing are interchangeable. The predicted projection space pixels 276 may be obtained from the predictor H (in box 275), using the prior voxel density estimate data 266. The nonlinear (or linear) reference transformation $f_{12}$ will tend to be pixel-by-pixel an approximation of $f_{11}$. Here, $f_{11}$ and $f_{12}$ may differ, for example, when elements of $f_{11}$ require adjustments for artifacts in data 201, to allow robust estimation processing. As another example, $f_{12}$ may be a linear function or a set of linear functions.

In box 215, innovation data 216 may be calculated in the transformed domain. In one embodiment of box 215, one or more measured transformed pixels 206 may be compared with predicted transformed pixels 211, the non-linearly transformed data from smoothed predicted projection data 286 to produce a difference corresponding to innovation data 216. In other words, in box 215, the difference between corresponding measured transformed pixels 206 and predicted transformed pixels 211 may be calculated to produce the first pixel innovation result data 216. The first pixel innovation result data 216 may be used for residual analysis and for optimizing systems parameters to ultimately yield the best possible object density reconstruction. In box 215, each of the corresponding pixel locations weighted combinations z of the inverse slopes of the nonlinear input transformation $f_1$ from box 205 and the inverse slope of the nonlinear reference transformation $f_{12}$ from box 210 of the associated density domain pixel values (in the neighborhood of the corresponding pixel locations) may be individually computed. In noisy or inaccurate data 276, and especially noisy data 201, the slopes corresponding to particular density domain pixel values, may include their spatial and their sequentially neighboring values, and may be subject to reevaluation using robust functions.

In box 220, first pixel innovation result data 216 may be scaled by a pixel-by-pixel matching matrix Z to generate error data 221. The pixel-by-pixel matching matrix Z may be computed from the current projection space data and characteristics of their transformation. The scaling matching matrix Z in box 220 may be calculated by organizing a set of z's, such that each z corresponds to an associated pixel location. The calculation may use inverse slopes of the nonlinear input transformation functions 205 and inverse slopes of the nonlinear reference transformation functions 210 for corresponding input and reference pixel values. The coefficients of matrix Z may be representations of the combined inverse slopes of the pixel transformation function $f_{11}$ at pixel values of one or more measured transformed pixels 206 and $f_{12}$ at pixel values of predicted transformed pixels 211. The combination of the inverse slopes z uses a process that is likely to produce near optimal values z-opt in the noiseless case and combines them to be likely to produce a close approximation to z-opt in the noisy case. In box 220, a second pixel innovation result 221 may be computed using the pixel-by-pixel product of the first pixel innovation result data 216 and the corresponding elements of the pixel innovation scaling matrix Z. The pixel-by-pixel innovation scaling matrix Z may be calculated using for each pixel an inverse slope of the corresponding nonlinear input pixel density transformation function 205 and an inverse slope of the corresponding nonlinear reference pixel density transformation function 210. The nonlinear input pixel density transformation function 205 may be range limited or robust (e.g., constrained values). The nonlinear reference pixel density transformation function 210 may be range limited or robust (e.g., constrained values).

In box 220, a matrix gain refinement equivalent to the technique of U.S. Pat. No. 8,660,330 based on the sequential properties of the pixel and neighboring first pixel innovation result data 216, may be optionally integrated.

In the optional box 225, a second in-series innovation gain matrix G equivalent to the technique of U.S. Pat. No. 8,660,330 based on the sequential properties of the pixel and neighboring pixel innovation results may transform the second pixel innovation result data 221 into a third pixel innovation result data 226. In box 225, elements of the pixel-wise correcting gain matrix G may be associated with a corresponding pixel in the second pixel innovation result data 221 and the third pixel innovation result data 226. The second pixel innovation result data 221 may be used to compute the third pixel innovation result data 226 using, for example, the gain evaluation technique based on the sequential properties of the first pixel innovation result data 216 or second pixel innovation result data 221, corresponding to the gain evaluation technique of U.S. Pat. No. 8,660,330.

In box 230, the raw corrective gains may be determined corresponding to the gain evaluation technique of U.S. Pat. No. 8,660,330, using the sequential properties in any of the innovation processes. For example, in box 230, using a weighting function, the pixel-wise correcting gain matrix 225 is computed by regression on one or more spatially neighboring coefficients of innovation gains or one or more sequential coefficients of innovation gains from preceding iterations. The correcting gain matrix 225 represents measurement and model defects. The raw correcting coefficients prior to regression are computed in an innovation processor 230 using at least one of the first pixel innovation result data 216 or the second pixel innovation result data 221, to identify innovation patterns A or B, and act with corresponding raw correcting increases or raw correcting decreases of coefficients.

In box 235, the third pixel innovation result data 226 may be provided to a tomographic reconstruction algorithm to obtain preliminary voxel update data 236. The tomographic reconstruction algorithm may be, for example, a linear reconstruction algorithm (LRA). For example, the tomographic reconstruction inversion algorithm using the DC/average projection value of Zeng et al. [1] may be used. As another example, the tomographic reconstruction algorithm may be a back-projector. Typically, the relations between the necessary projection DC/average values and other frequency components, characterized by a set of systems parameters, may depend on the amount and orientation of available projection data. For example, for two (noiseless) orthogonal projections, reconstruction with the invention may not require filtering of projections for reconstruction.

In box 240, the preliminary transformed object density update data 236 may be rescaled with the elements of a voxel-by-voxel update scaling matrix L, where each transformed object voxel density update data 241 may be associated with an element of the matrix L. The voxel-by-voxel update scaling matrix L may be computed from the transformed object data and the characteristics of a positive constraining transformed object voxel data transformation. Values of the elements of the matrix L may be computed from the inverse slope of the elements of the voxel-by-voxel back-transformation using voxel-by-voxel elements of $g_{22}$ in box 250 of the corresponding transformed voxel density estimate 246.

In box 245, the transformed density estimate 246 may be calculated by adding the transformed object voxel density update data 241 to the corresponding transformed preceding voxel data estimate 291. The transformed density estimate 246 may be stored in data storage device 180 for later use by the investigator 170.

In box 250, the transformed density estimate 246 may be back-transformed into the density domain to obtain the raw voxel density estimate data 251. In box 250, the data is transformed from the transformed domain to the density domain. Transformed density estimate 246 may be voxel-by-voxel non-linearly transformed using the matrix elements $g_{22}$ to produce raw voxel density estimate data 251. In one embodiment, in box 250, the matrix elements $g_{22}$ may be function types as an approximate inverse of the, one or more, function types of the matrix elements of $f_{11}$ or $f_{12}$ for major sections of the matrix $g_{22}$, and the matrix elements of $g_{22}$ may be used to compute output values satisfying external inputs in at least one region of the data range of the transformed density estimate 246. The functions of box 250 are also referred to herein as a "positive constraining functions."

In box 255, the raw voxel density estimate data 251 may be filtered to obtain the preliminary voxel density estimate data 256. Box 255 may use a low pass filter to smooth the raw voxel density estimate data 251. Box 255 may filter the raw voxel density estimate data 251 to output the preliminary voxel density estimate data 256 as positive. The low pass filters in boxes 270 and 285 may share the property of keeping their outputs positive, and may replace the function of box 255.

In box 260, the preliminary voxel density estimate data 256 of the object, may be post-processed by P operating on a single voxel at initial iteration and a multiplicity of voxels subsequently, refining density values using suitable a priori information about the properties of voxel density estimate data 261. This technique may start with a single voxel, but does not require a plurality of voxels at the outset. Post-processing the preliminary voxel density estimate data 256 may create one or more voxels based on one or more of (a) equal or increased grid resolution or (b) equal or increased density value resolution. In box 265, voxel density estimate data 261 may be recorded, delayed, and transmitted as prior voxel density estimate data 266 as inputs to the filter of box 270 and then to the transformation $f_{21}$ of box 290, and also as inputs to the predicting projection processor H of box 275.

In box 270, the prior voxel density estimate data 266 is filtered to obtain smoothed prior voxel density estimate data 271. The filter of box 270 may be a low pass filter.

In box 290, the smoothed prior voxel density estimate data 271 may be transformed into preceding voxel data estimate data 291 using nonlinear reference transformation family $f_{21}$ (where, for example, $f_{21}=\log(.)$). In box 290, the data is transformed from the density domain to the transformed domain. The nonlinear reference transformation family $f_{21}$ may also be referred to herein as a feedback function 290 and as a set of feedback functions in box 290.

In box 275, the prior voxel density estimate data 266 may be processed to obtain predicted projection data 276, typically using a representation of a single sparse projection matrix H. The matrix H may be designed to duplicate the imaging of the original object density values as object projection density values. Uncertainties in the imaging process in FIG. 1, however, may result in uncertainties in the matrix H and may be expressed in a vector parameter p for adjustment when more is learned about the imaging process. For example, the matrix H may express scatter for a particular voxel using patterned off-voxel-projection components, parametrized in the vector p. For practical processing, however, explicit use of the matrix H may be avoided.

In one embodiment of box 275, functionality may be related to those discussed in, for example, Zhang et al. [2] and Long et al. [3].

Further, the projection process in box 275 summarized in the matrix H may, for example, represent at least one system parameter or object parameter. The system parameter may be, for example, one or more of the focal spot geometry, focal spot beam exit intensity and hardness exit profile characterization, changing tube supply voltage, beam dependent x-ray detector characteristics, or x-ray scattering. The object parameter may represent, for example, object movement. These process uncertainties (e.g., system parameter(s) and/or object parameter(s)) may be summarized in a vector parameter p. Note, that in image reconstruction the number of unknown voxel values exceeds the number of unknown coefficients in vector p by far, so that the small fraction of components in p itself may be made subject to estimation. In sparse measurement situations, p and the object voxels may be made subject to estimation by placing constraints on the voxel density, by, for example, using box 255 or box 260.

In box 275, a tomographic projection algorithm may be used with a vector parameter p in H(p). After convergence of the processing loops shown in FIG. 2, and without changing p the parameter p may be adjusted to search for improved solutions to performance criteria. The performance criteria may, for example, be based on the final set of residuals of the innovation process 216, the residual set 160, or a mismatch of values between the computed and reference object values.

In box 210, the nonlinear transformation $f_{12}$ may be applied to the predicted projection data 276, obtaining the transformed prediction data 211.

Vector parameter p uses data 216, 221, 226, or 160, for example, for their weighted sum-of-squares minimization, to optimally fit systems parameters to changing projection conditions. Projection conditions are expressed, for example, in parameters of the projection operation in H in box 275, post processing method P summarized in box 260, and parameters in functions $f_1$ in box 205, functions $f_{12}$ in box 210, functions $f_{21}$ in box 270, and functions $g_{22}$ in box 250.

Data 246 and 261 may be modified to satisfy external systems variables and objectives. For example, a resetting of some object density variables contained in data 246 or 261 to fixed a priori known values may support more rapid convergence of remaining object density variables and systems parameters.

In box 275, the predicted projection data 276 may be computed based on a set of one or more object space voxels, wherein the set of object space voxels may cover a plurality of resolution grids (e.g., including a single grid point) of varying sizes when the set of the object space voxels are projected onto projection space.

In box 275, projection values of voxels for suitable sets of (one or many) pixels may be computed. Remaining projection values may be computed using other sources of information to the extent necessary.

In box 280, the residual data 160 may be produced from the projected pixel data 201 and the predicted projection data 276. When the residual data 160 approaches the noise of the measurement techniques (e.g. white noise in case of x-ray imaging) and traces of unexplained projected object density can be neglected (e.g. because the coefficients in parameter p are well determined and the data densities in the loop expressed in FIG. 2A and FIG. 2B have converged sufficiently), the computed residual data 160 may be transferred to the investigator 170 and the output device 175.

In box 225 a correcting gain matrix may be computed at each innovation using a spatial and sequential weighting function weighing one or more raw, neighboring and preceding, innovation gains computed with a method that uses, for example, at least some of the features of the loop gain determination used in U.S. Pat. No. 8,660,330. Implementing features of U.S. Pat. No. 8,660,330 to the present feedback loop of FIG. 2 increases raw gain coefficients in box 230 when innovations 216 or 221 are consecutively statistically significant of equal sign, creating pattern A, and decreases raw gain coefficients in box 230 when innovations are consecutively statistically significant of alternating sign, creating pattern B. Different versions of this approach are possible. A more primitive process version would be, starting from significantly incorrect values of raw gain coefficients with particular innovation patterns to gradually change with every iteration i, the gains to reduce the significance of the associated pattern until detecting significant alternative patterns to reset their associated raw gain coefficients to earlier values, starting the process over again. This option of gain adjustments in box 225, using the preceding innovation processes in box 230 or other suitable mechanisms, is provided to reduce the effect of sub-optimal gain determinations within the iterative loop computations, such as resulting from systems noise, the filter effects in, for example, the object space of the density domain, back projection filter property errors, use of robust influence functions, unit DC loop feedback gain deviations, and other model defects. For example, for a first pixel innovation result data 216 refined with a first set of influence functions (compare Sunnegardh [15]), a second pixel innovation result data 221 refined with a second set of influence functions, and a third pixel innovation result data 226 refined by a third set of influence functions, the invention may compute a correcting gain matrix coefficient using a weighting function that may be computed by regression on one or more spatially neighboring innovation matrix coefficients or one or more sequential innovation matrix coefficients from preceding iterations to account for measurement and model defects. The one or more sequential innovation matrix coefficients may also be referred to as one or more sequential coefficients of innovation gains.

An object of interest may be refined iteratively by the investigator in box 170 controlling p, using the weighted and converged innovation residuals of 160, 216, 221, or 226 created by final iterations for each set of 1 within the loop of FIG. 2. Perturbations of the parameter 1 computed in the outer loop, where each set of weighted innovation residuals is taken from sufficiently well-converged iterations within the inner feedback loop 165, shown in FIG. 1, and summarized in FIGS. 2A and 2B, may be used for optimization.

The externally controllable components of the parameter 1 may gradually change from an initial estimate to that forming the best match to external objectives or minimal cost in terms of innovation residuals 160, 216, 221, 226, or, for example, deviations from a known systems reference model, such as in simulations, or when evaluating convergence of an object density estimate to the density of a reference object. The investigator computer [170] externally to the image reconstructor computer [165] may be operable to gradually change controllable components of a parameter vector from an initial setting to those producing the lowest cost relative to an external objective, while using properties of at least one of the projection residuals or object residuals characterizing the difference between a known reference object and the corresponding computed object density.

Projection residuals may be processed with robust estimation influence functions that have been vetted through simulation of object and recording challenges using a priori parameters or parameters that represent and/or are derived using their neighborhoods. The parameters may be, for example, functions of one or more of local input measurements, systems properties, prediction values, or a priori expected object and measurement properties.

Projection residuals may be processed with at least one of smoothing the residuals over select ranges, scaling the residuals over select ranges, or weighing by an influence function over select ranges.

Innovation data 216, 221, 226, preliminary update data 236, and update data 241 may be processed using influence functions. Measured pixel data 155 may be processed using influence functions. Similarly, during simulation of known object density reconstruction, for example, mismatch residual MMR-261, may be processed using influence functions.

Embodiments of the process in FIGS. 2A and 2B may include, for example, extended high efficiency computed tomography with optimized recursions (eHECTOR) that uses the ability of a linear reconstruction algorithm (LRA) (e.g., filtered back-projection (FBP) or other qualified, preferably linear, reconstruction algorithm) to address eigenvalues of the tomographic inversion problem efficiently. For this purpose, the LRA may be embedded in a non-linear structure that may be linearized using pixel-by-pixel small-signal data gains in 220, 225, and 240. In the same way as, for example, FBP produces good, although not perfect object density estimates in a single step, FBP may be used here recursively on a linearized model of a transformed estimation problem. The net effect is, that this linearized loop of FIG. 2 represents a highly contractive mapping inducing geometric shrinking of estimation errors. This shrinking will terminate when residual errors, such as measurement noise, or model errors induce inconsistencies that may not be resolved by further iterations. Inconsistencies may be seen in projection residuals and are a driving force for re-estimation of the vector parameter p.

For a linearized eHECTOR, ideally, a linear Kalman filter might be used. For tomographic reconstruction, however, the determination of this optimal Kalman filter is beyond modern computing resources. Instead of using the optimal Kalman gain in this filter in box 235, a LRA is used to approximate the present memoryless Kalman filter gain.

When modeling linear filtering with the optimal Kalman filter, the sequence of innovations form a white noise process. The variance of the innovation process results from the random driving power/data of the message model and the observation noise (see Sage et al. page 268, [4]). For the non-linear loop-setup in eHECTOR, however, a sub-optimal approach, modest-correlation sequential innovations are produced. For this reason, the loop structure in eHECTOR deviates in several ways from an optimal least-squares algorithm, e.g. the optimal Kalman filter. For example, the LRA is a suboptimal approximation for the optimal filter gain. Furthermore, small-signal data linearizations are only an approximation for the application of an optimal filter, and the innovation process will not be a white process. Nevertheless, for modest density data value changes a well-chosen LRA, such as used in present filtered back-projection tomography, provides at every iteration a highly contractive mapping. When, for example, grid resolution increases gradually modest density value changes can be expected, allowing convergence of the non-linear filter with few iterations. Computational cost of iterations accumulates in a geometrical sum where the last iteration determines the dominant cost component, for example, close to that of a single back-projection or inversion.

When the grid resolution is increased, the spatial high frequency components in the innovation process may become more pronounced. In x-ray tomography, for example, at convergence of the object density estimate, these spatial high frequency projection components will produce near white spatial measurement noise. Sequentially, when the grid resolution is increased the correlation of innovations remain modest. For these, and other aspects of the approximations, however, the present loop-setup is sufficient for practical and efficient computation of tomographic reconstruction and forms the basis for the computations used in the image reconstructor 165, shown in detail in FIGS. 2A and 2B.

In an embodiment of the invention, the sequential processes of iterations in box 165, neglecting the low-pass data filter in box 255, the increase of grid resolution with small innovations, and the use of an approximate, sub-optimal, not explicitly computed LRA gain, may be compared with an optimal linear Kalman filter with fixed dimensionality of its state variables, explicitly computed gain K, and well specified prior statistics with finite variance.

None of these Kalman filter conditions accurately represent the computations in FIG. 2. Nevertheless, this computational model allows a qualitative evaluation of the iterative process in FIG. 2.

For comparison and estimation of expected performance for the ideal situation, Table 1 depicts a discrete, optimal, Kalman filter algorithm, edited, as shown in Sage et al, p. 268 [4].

TABLE 1

Discrete Kalman filter algorithm.
Discrete Kalman Filter Algorithm

| | |
|---|---|
| Prior statistics | $E\{w(i)\} = 0$ $E\{v(i)\} = 0$ $E\{x(0)\} = \mu_x(0)$ |
| | $\text{var}\{x(0)\} = V_x(0)$ |
| | $\text{cov }\{w(i), w(k)\} = V_w(i) \delta_K (i - k)$ |
| | $\text{cov }\{v(i), v(k)\} = V_v(i) \delta_K (i - k)$ |
| | $\text{cov}\{w(i), v(k)\} = \text{cov }\{x(0), w(k)\} = \text{cov }\{x(0), v(k)\} = 0$ |
| Initial conditions | $\hat{x}(0|0) = \hat{x}(0) = E\{x(0)\} = \mu_x(0)$ |
| | $V_{\tilde{x}}(0|0) = V_{\tilde{x}}(0) = \text{var}\{x(0)\} = V_x(0)$ |
| Message model | $x(i + 1) = T(i + 1, i)x(i) + \Gamma(i)w(i)$ |
| Observation model | $z(i) = H(i)x(i) + v(i)$ |
| A priori variance algorithm | $V_{\tilde{x}}(i + 1|i) = T(i + 1, i)V_{\tilde{x}}(i)T^T(i + 1, i) + \Gamma(i)V_w(i)\Gamma^T(i)$ |
| Gain equation | $K(i) = V_{\tilde{x}}(i|i - 1)H^T(i)[H(i)V_{\tilde{x}}(i|i - 1)H^T(i) + V_v(i)]^{-3}$ |
| | $= V_x(i)H^x(i)V_v^{-3}(i)$ |
| A posteriori variance algorithm | $V_{\tilde{x}}(i) = [I - K(i)H(i)]V_{\tilde{x}}(i|i - 1)$ |
| Filter algorithm | $\hat{x}(i) = T(i, i - 1)\hat{x}(i - 1) + K(i)[z(i) - H(i)T(i, i - 1)\hat{x}(i - 1)]$ |

The linearized part of the Kalman filter comparison is modeled in the following way. For simplicity, consider a static system, that is the absence of a noise driven dynamic systems component (Table 1), and let $V_w(i>0)=0$ but let the initial variance $V_x(0)=V_w(0)=V_m \neq 0$ represent an initial model state co-variance matrix. The estimation of the state $x_m$ of the model is the combination of the preceding state estimate plus the innovation weighted by the Kalman gain K(i) (Sage et al., p. 268 [4]). Uncorrelated observation noise $V_v(i)$ is assumed here despite using the same fixed set of measurement components, rather than a new set of independent measurements-noise contributions. Sequential correlation is neglected, for example, in view of smoothing operations, similar increases of grid resolution, and redundant measurements, because noise data may then be mutually inconsistent. As such, sequential correlation (almost) cannot be expressed in the object density (except for the damaging image noise) and the state update may therefore use the same computational step as in the presence of white noise. This model may be justified to the extent that reconstruction of a fixed set of noise values without the presence of an object 125 will produce negligible voxel densities, when compared to an eventual presence of the object 125. In practice, boxes 255, 260, 270, and 285, with very modest filter effects, may suppress high-frequency components in voxel data values, leaving correspondingly large residual projection values due to, for example, "object projection inconsistency." The linearized part of the, initially not necessarily optimal, Kalman filter model may be represented as follows for the object density state vector x:

$$x(i)=x(i-1)+K(i)x[z(i)-H(i)x(i-1)] \quad [1.1]$$

$$K(i)=V_x(i)H^T(i)V_v^{-1}(i) \quad [1.2]$$

where $V_w(0)$ represents the initial object density variance contained in the state variance $V_X(i)$ [1.3]

$z(i)=H(i) x(i)+v(i)$ the projection measurement vector [1.4]

where $H(i)$ the observation matrix for the object density state vector $x(i)$ and [1.5]

$v(i)$ is the observation/measurement noise. [1.6]

In the case of a message object density model driven by systems noise $V_w=0$ and constant, uncorrelated, observation noise $V_v(i)$, the Kalman gain K(i) will converge to zero as i→infinity:

$$K(i) \to 0 \quad [1.7]$$

Given a fixed pattern of observation noise, it may be sufficient to leave $$K(i+1)=K(i) \quad [1.8]$$

during iterations with fixed grid resolution and while determining the operating points for data processing linearization in the corresponding eHECTOR.

In CT with large object voxel and projection pixel numbers, for numerical reasons, the Kalman gain filter system, especially the Kalman gain, cannot be computed. LRA approximations with comparable properties, however, are available. Although such an approximation to the optimal Kalman gain does not provide one-step inversion as in Radon's [5] setting, the small systems minimum variance implementation by Wood et al. [14], or the optimal Kalman filter, good contractive LRAs for large systems may be derived. For example, contractive mappings similar to FBP can be derived (see, however, Zeng et al. [1]) using approximations motivated by Radon's approach [5].

FIG. 2 also shows a special case of using, for example, logarithmic functions $f_{11}$ (box 205), logarithmic functions $f_{12}$ (box 210), logarithmic functions $f_{21}$ (box 290), exponential functions $g_{22}$ (box 250), innovation scaling matrix Z (box 220), and update scaling matrix L (box 240). For boxes 220 and 240, both matrices Z and L, respectively, may be represented by diagonally dominant matrices, each diagonal element corresponding to data elements such as a single pixel or a single voxel in the data stream. At iteration i in FIG. 2A in box 220, the elements of matrix Z(i) may represent pixel-by-pixel a weighted average of a first component of small-signal inverse slopes of function $f_{11}(s(i))$ (box 205) for projection data pixels set s(i) 201, and a complimentary corresponding weighted second component of the small-signal inverse slopes of function $f_{12}$ ($p_f(i)$) (box 210), where $p_f(i)$ may be the set of values of predicted feedback measurement pixels 276. In box 240, the elements of matrix L(i) may represent voxel-by-voxel the small-signal inverse slopes of function $g_{22}$ ($d_{f_r}(i)$) or its weighted average with the small-signal slope of function $f_{21}$ (266).

The function $f_{11}$ (box 205) and the function $f_{12}$ (box 210) may form a pair of identical sets, while the function $f_{21}$ (box 290) and function $g_{22}$ (box 250) may form a pair of sets of mutually inverse functions. Depending on the purpose, the functions for functions $f_1$ (box 205), $f_{12}$ (box 210), and $f_{21}$ (box 290) may be, for example, the logarithmic function (for example, for very small projection count) or the square-root function (for, for example, photon count signal variance stabilization of measured positron emission tomography (PET) or single photon emission tomography (SPECT). The functions $g_{22}$ (box 250) may be, for example, the exponential or portions of a quadratic function. The function $f_{11}$ (box 205) and the function $f_{12}$ (box 210) may be, for example, a Poisson variance stabilizing square-root function of the one or more input projection pixels.

An alternative and an extension to the concept in U.S. Pat. No. 8,660,330 to deriving the gain matrix G of the approximate Kalman filter for CT Reconstruction may be used. For this purpose, a generalized, non-linear approximate, Kalman filter designed to allow constraints, is summarized in FIG. 2. An aspect of the enhancement is the embedding of an approximate back-projection or other inversion algorithm in box 235, to emulate an approximate Kalman filter gain within the present nonlinear framework. These functional and structural modifications would compromise a one-step optimal estimator, but allow rapidly converging tomographic reconstruction using linearization within a voxel density estimation filter. The generalization adds matrices Z (box 220) and L (box 240), related to the non-linear function choice for $f_{11}$ (box 205) and $f_{12}$ (box 210), and $f_{21}$ (box 270) and $g_{22}$ (box 250), shown in FIG. 2.

Table 1 yields for the static linear model shown in FIG. 2:

$$T(i+1, i) = I \quad [2.1]$$

$$\Gamma(i) = I \quad \text{for } i = 0 \quad [2.2]$$
$$= 0 \quad \text{for } i > 0$$

Prior statistics $E[x(0)]=\mu$ may contain fixed sub-sections of x represented by the vector y, such as for regions with a priori know density values $\mu_{xi}$, like implants. Their corresponding $V_{yy}(i)=0$. Correspondingly, x is reset to $\mu_e$ within iterations, where $\mu_e$ represents the subset of $\mu_{xi}$ transformed with $g_{22}^{-1}$.

Effective linear image reconstruction (LRA) produces a contracting mapping $C_x$ with its roots typically $\ll 1$ (and $\det\|C_x\|\ll 1$).

$$V_x(i)=C_x V_x(i|i-1))=C_x V_x(i-1) \quad [2.3]$$

and the a posteriori variance algorithm yields $$K(i)H(i)=I-C_x(i) \text{ or } C_x(i)=I-K(i)H(i) \quad [2.4]$$

For the small signal representation, a new Kalman gain K' may be specified and associated with the small signal loop gain-matrices Z (box 220) and L (box 240). The small signal loop gain-matrices Z and L may be based on the slopes of the nonlinear transforms. For example, gain matrix Z (box 220) may be used to compensate for the slopes of the functions fn1 and $f_{12}$ associated with the operating point of the input transform in box 205 (where the projected pixel data 201 comes in (e.g., logarithmically transformed) and the prediction data 211 from box 210. Similarly, for example, gain matrix L (box 240) may be associated with the output transformation $g_{22}$ (e.g. exponential) and its inverse $f_{21}$. In the linear case, the Kalman K matrix (box 235) may be, for example, approximated by a LRA such as the filter back-projection (FBP) or the back-projection filter (BPF) approximation (see, e.g., Zeng et al. [1]), and H may be the forward projection of the estimated object, including phenomena such as scatter.

The optional gain matrix G (box 225) may support corrections to K (box 235) because K is usually approximated, and G (box 225) aids to compensate effects such as the entropy increasing, stabilizing, and constraining low-pass filter, a priori constraints, and other interventions in the feedback loop. The low-pass filter 255 and a priori object knowledge 260, may be set up to support stability of eHECTOR, especially in sparse projection data object density computation.

The small signal analysis may start with given input data 201 for the degenerate case of a single grid point for all matrices and adjusting, for example, scalar gain (matrix) G to provide unity (DC) loop gain. When more grid points are used, the initial loop gain may, for example, be adjusted using the matrix G, based on the observed innovation sequence data similar to U.S. Pat. No. 8,660,330, or other criteria. In some embodiments of the analysis of the feedback loop (e.g., when the object reconstruction problem at the particular grid resolution is not from a sparse measurement data set such as when using a small number of projections), the use of the smoothing operation (entropy increase operation) in box 255 may be neglected or adjusted to have a minimal effect.

For the case of little noise and small innovation data 206, the non-linear filtering problem in FIG. 2 may be analyzed using the Kalman filter equations shown in, for example, Table 1.

For simplicity, assume pixel data s in 201 has values close to the predicted pixel values p in 276, corresponding to modest noise and close convergence of the computed object density to the actual object density. In this case, for example, the pixel-by-pixel slope values of the function $f_{11}$ of data 201 and pixel-by-pixel slope values of the function $f_{12}$ of data 276 are approximately the same (s≈p). In order to compensate the small-signal loop gain properties of a feedback perturbation $\Delta p$ of 276 (or similarly for a measurement data perturbation $\Delta s$ of 201), the small signal diagonal gain matrix Z (box 220) may have the following inverse slope elements (assuming s≈p):

$$z_{dd}=\delta p_d/\delta f_{11}(p_d)=z_d \quad [2.5]$$

where $z_d$ represents the diagonal non-zero Z-matrix element with index d, and $\delta$ is the differential operator. The slope $z_d$ may also be a weighted combination derived from the function $f_{12}$ and the function $f_{11}$ depending on noise properties of the data 201 and 286. The use of coefficients $z_d$ may be subject to constraints by influence functions which are discussed further below.

The approximated small signal perturbation may then be passed through the LRA (box 235), approximating the Kalman filter gain, computing the preliminary voxel updates.

The small signal output of the filter (data that corresponds to x(i) in Table 1) may be followed by a small-signal transformation matrix L (box 240) compensating the subsequent non-linear gain of the transformed object density estimate $d_{tr}(i)$.

The diagonal matrix L (box 240, relative to voxel density $V_q$) has elements:

$$l_{qq}=\delta v_q/\delta g_{22}(v_q)=l_q \quad [2.6]$$

replacing index qq→q to indicate the diagonal elements. The use of coefficients $l_q$ may be subject to constraints by influence functions which are discussed further below.

Combining components 220, 235, and 240, but
(i) leaving for simplicity G=I;
(ii) assuming dim(z)≥dim(x), z's being redundant but independently collected measurements for computing the object density x,
yields a new small signal, input data 201 dependent, Kalman filter like gain matrix K' (neglecting the smoothing operation/entropy increase 255 and operations in 260 within the loop used in case of dim(z)<dim(x)):

$$K'=LKZ \quad [2.7]$$

Matrix $L^{-1}$ follows again from the small signal approximation (slopes) of the nonlinear contribution of the function $g_{22}$ (box 250) component terms. Neglecting boxes 255 and 260 in this simplified model, the projection matrix H (box 275) is modified by the linear approximation formed by the weighted combination $f_{11}[s_d(i)]$ (box 205) with $f_{12}[p_d(i)]$ (box 210), with operating points in the range of $p_d(i) \cong s_d(i)$ to produce the diagonal matrix $Z^{-1}$, for example, in the case of logarithmic transformations in $f_{11}$ and $f_{12}$ with a weighted combination of slope elements, where $1/p_d \cong 1/s_d$. Hence, with the small signal replacements of $g_{22}$ with $L^{-1}$, and $f_{12}$ combined with $f_{11}$ leading to $Z^{-1}$, a new small-signal data perturbation projection matrix H' is obtained, defined as:

$$H'=Z^{-1}HL^{-1} \quad [2.8]$$

Checking the joint property of the new Kalman gain K' and the observation matrix H', the a posteriori algorithm yields with the diagonal (scaling) matrices L and Z the loop gain $$K'H'=LKZZ^{-1}HL^{-1}=LKHL^{-1}=L(I-C_x)L^{-1}= \\ (I-LC_xL^{-1}) \quad [2.9]$$

where $\det\|L\|\det\|L^{-1}\|\Pi=1$, roots of $C_x \ll 1$, when we assume the use of a good LRA. Recursively passing through the feedback loop yields for the small-signal approximation a geometric object density contraction factor limited by the deviation $C_x$ of the approximation of the LRA to the optimal Kalman filter gain. Compare, for example, the a posteriori variance algorithm for the linear Kalman filter in Table 1, showing the reduction of posterior variance as a function of the match between I and KH. Conversely, inconsistent measurement components lead to weighted least-squares estimation without further contractive mapping. The structure of the residuals at convergence aid in diagnosing systems performance. For example, white noise projection residuals and negligible object features, if any, in the projection residuals may indicate convergence and quantify accuracy of the model obtained in reconstruction.

Judgment on $C_x$ (i) expressing the efficacy of K(i) (equation 2.9) may be based on:
(i) the contraction of residual object features in a sequence of iterations;
(ii) the presence of measurement-induced projection background noise, for example, approximately white projection noise in case of x-ray or electron beam tomography, free of object projection features, for example, by examining the difference between residuals of the same object but different sets of measurements; and
(iii) the presence of sequential near white innovation data 216 when comparing innovations at increases in the grid resolution (retrospective innovation steps from lower grid resolution need to be interpolated to correspond to pixels at higher resolution of 216).

In order to compensate for inaccuracies of the LRA K (box 235), respectively, for example, $\det\|C_x\|\neq 0$, as well as the low-pass smoothing/entropy increase operation (box 255) after the output transformation (box 250), K may be augmented with an innovation gain adjuster matrix G (box 225). The gain adjuster G (box 225) modestly modifies gain values in the range of the operating points for the slopes of $f_{11}$ of the input data (box 205) and the slopes $f_{12}$ of the prediction data of the observations (box 210). The gain adjuster matrix G may be influenced by factors such as beam hardening, resulting from consistent under estimation or over estimation of predicted projection density. Methods specific to correcting these beam-hardening effects have been developed by others. The value of using the matrix L is to compensate the small-signal loop gains associated with the functions $g_{22}$ supporting an overall small signal loop gain from 216 to 211 of the identity I (equation 2.9), their difference forming in box 215, implying a small difference aside of noise, and consequently rapid convergence of the object density during iterative computations.

While mostly small signal properties of the function $f_{11}$ (box 205), the function $f_{12}$ (box 210), the function $f_{21}$ (box 290), and the function $g_{22}$ (box 250) may be used for matrix Z in box 220 and matrix L in box 240, some of the small signal matrix elements may be set to zero or be left out in the presence of some a priori information. For example, the object density may be known a priori at some points, such as for implants or the density surrounding the patient. Elements associated with estimating these object densities may be left out, and corresponding object density data replaced with the known data values.

For tomographic reconstruction, parameters that are not known or observed by other means expressing, for example, uncertainty in beam hardening due to object properties such as implants, beam spectral properties, variable emitted beam hardness, object movement, scatter, respiration and cardiac movement, and other systems components outside of the image reconstructor 165, may be represented and adjusted inside the image reconstructor 165, for example, in the projection matrix H (box 275), shown in FIG. 2. Such parameters may also adjust the functions in boxes 200, 205, 210, 250, 255, 260, and 290. These parameters may be estimated jointly or separately, for example, using the Levenberg-Marquardt (LM) approach. After recording a set of measurements the LM, or equivalent, approach computes from the residual data, which in turn were computed from sets of changed parameters inside the image reconstructor 165 when their corresponding object estimates have converged, adjustments to the parameters with uncertainty continue until they have converged.

Figure 3:
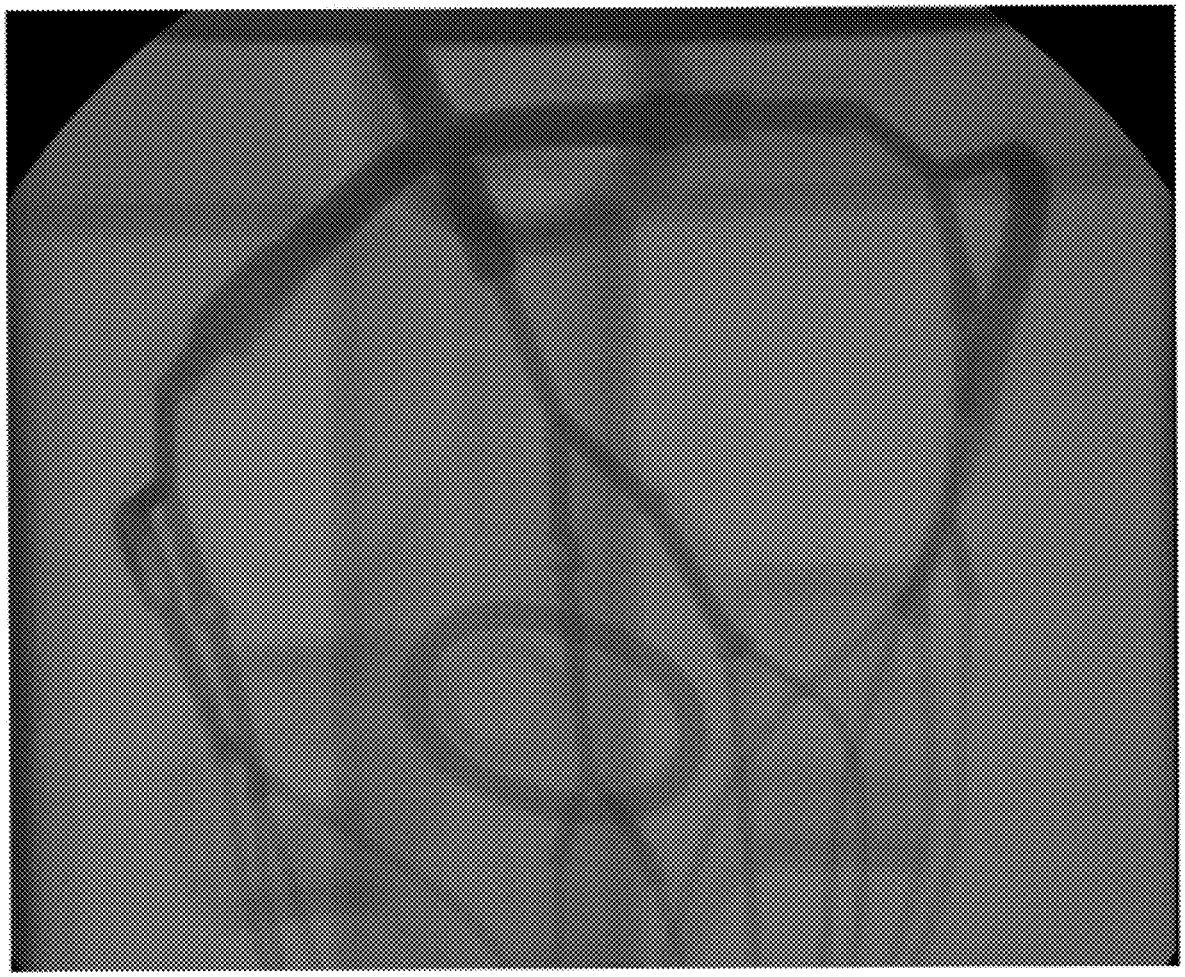
FIG. 3 depicts an example x-ray projection during contrast dye injection.

An example of such LM-based reconstruction is shown in FIG. 3 and FIG. 4, using the LM processing for the estimation of a beating model of a coronary tree, the data being collected with a clinical bi-plane C-arm system. The model parameter computation used over 50 parameters to re-estimate the alignment of projections resulting, for example, from static and variable magnetic field image intensifier distortion, and C-arm position errors.

The initialization of the iterations in image reconstructor 165 may start at a lower grid resolution, for example from a single voxel and a single pixel for each projection, rather than a multiplicity of voxels. The initial voxel density follows, for example, from the average of the projected densities. Then, with iterations, the grid resolution may be increased to the desired level. Changes of resolution may not be at equal iteration intervals or with equal resolution scale-steps. The number and sequence of incorporating components of model parameters p as grid resolution is increased may be predetermined, based on reduction of errors, or information criteria as in, for example, Schwarz [6] and Akaike [7]. Acceptance of parameter coefficients, for example, may be based on measures of data 206, or 160, and the degree of improvements incorporating components of p for reconstruction, and may be used for determining the importance of parameters and their selection.

After initialization, the major gain adjustments of the loop gain are determined by box 220 and box 240. Remaining gain adjustments, if any, may be implemented using the gain in matrix G(i) (box 225) that may be derived from the patterns of sequences of preceding innovations 216. Significant oscillations at fixed grid resolution may indicate excessive gain, persistent and significant static innovation values insufficient gain, and random patterns appropriate gain (see, e.g., U.S. Pat. No. 8,660,330).

Comparison of Inventive Techniques

Nonlinear iterative tomographic reconstruction has been pursued intensively by many and for many years. For example, Elbakri et al. [8] and [9] describe approaches to account for the polyenergetic X-ray source spectrum, energy dependent attenuation, and non-overlapping materials. Their objective is to compute an unknown object density using the known energy-dependent mass attenuation coefficient. Elbakri's approach is to formulate a penalized-likelihood function for this polyenergetic model and using an ordered subset iterative algorithm to estimate the unknown object density for each voxel.

Humphries' analysis [10] of a polyenergetic Simultaneous Algebraic Reconstruction Technique (SART), algorithm, addressing similar objectives, shows that convergence conditions depend on several factors, including properties of the attenuation coefficient. Furthermore, convergence of SART is not guaranteed: the spectral radius of the Jacobian matrix of the iterations is not necessarily less than one.

U.S. Pat. No. 8,923,583 reconstructed dual energy CT data from multi-spectral measurements by minimizing model likelihood D(y; x), using a stabilizing penalty function S(x). They note: "The disadvantage of this method is that the function D(y; x) is generally very complex and computationally difficult to model due to the nonlinear relationship between x and v" when reconstructing object x from measurements v.

Recently, Staub et al. [11] demonstrated the ability to use and track the motion of the patient anatomy on a voxel by voxel scale, using a small number of eigenvector representations for object reconstruction. Staub et al. [11] found the Nelder-Mead simplex algorithm the most robust approach to estimate the small number of parameters representing object movement.

For simplicity of exposition and overview of the innovative alternative computation that overcome above-noted difficulties, all model parameters of the new approach may be subject to estimation. Parameters of external equipment characteristics, such as characterizing beam hardening, X-ray source spectrum changes, equipment movement or misalignment, or object internal parameters, such as object material properties, object movement, etc., are combined in a single parameter vector 1. Systems changes may be characterized by the changes in this parameter, and revised computed estimates of the parameter data sent by the investigator 170 via 195, as shown in FIG. 1. Reconstruction parameters may, for example, use the residual sum of squares or other criteria of computed robust estimates of residual data using influence functions, for example of data 160, data 216, and, for example in the case of simulations, mismatch residuals (MMR-261), to determine reconstruction performance. Within this setting optimal object reconstruction is performed for any set of parameters, equipment and object. From the parameter vector p a globally optimal set of parameter data p is computed, that minimizes reconstruction errors or optimizes reconstruction performance.

Currently, even without estimating any unknown imaging systems components p, the object density estimation of published nonlinear iterative algorithms, converges slowly, as noted above. For applications where multiple components of the optimal data set p, including object external and in internal parameters have to be estimated, these systems are restrained by the following:

1. Significantly increased computational effort to add evaluation of even a single model parameter.
2. High correlation of projection residuals at every iteration showing strong object features even when convergence is apparently (or seemingly) achieved. This shortcoming is due to lack of a highly contractive mapping of the error density, for example innovations 216, that does not support effective adjustment of model parameters far from the optimum solution.
3. High correlation of projection residuals using explicit iterative numerical minimization (hill climbing) to determine the performance criterion for a single given fixed parameter p (in part due to the large distance from the minimizing solution), creating indefinite or near-singular parameter update matrices, limiting further the ability to consider a large number of variable model parameters.
4. Difficulties to identify stabilizing penalty functions d(y: x) (see, e.g., U.S. Pat. No. 8,923,583).

By contrast, the invention described herein, combines highly contractive parameter estimation techniques (equation 2.9). The effectiveness of the invention here may be derived from, for example:

1. The efficiency of using analytic, rather than numerical, methods provided by the linearized Kalman projection technique at the first level of iterative data processing, creating, within that level, highly contractive mappings from iteration to iteration with low numerical efforts (equation 2.9);
2. The gradual increase of grid resolution keeping changes of density estimates small enough to allow effective near-linear small signal approximation computations;
3. The numerical optimization of parameters within the vector p, where, being close to an optimal solution due to (1) above, within each iteration the matrix of projection residuals (of the iterations creating the innovation process) clearly expresses changes of these parameters (non-singularity of the Hessian matrix associated with the optimization). Parameters may represent, for example, influence on coefficients of the projection matrix $H_{mno}$, transformations $f_{11}$, $f_{12}$, $f_{21}$, and $g_{22}$, shown schematically in FIG. 2, and other relevant systems variables; and
4. Simplicity to design and apply stabilizing penalty functions, such as in box 225.

Figure 6A:
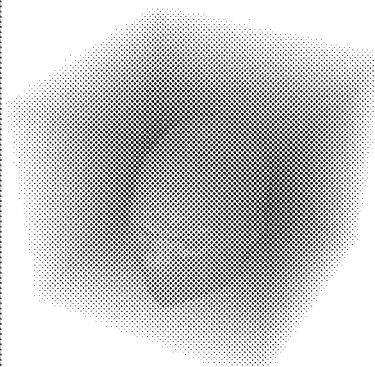
FIGS. 6A and 6B (collectively FIG. 6) depict example reconstructions of a head phantom from 200 projections (FIG. 6A) and five projections (FIG. 6B).
Figure 6B:
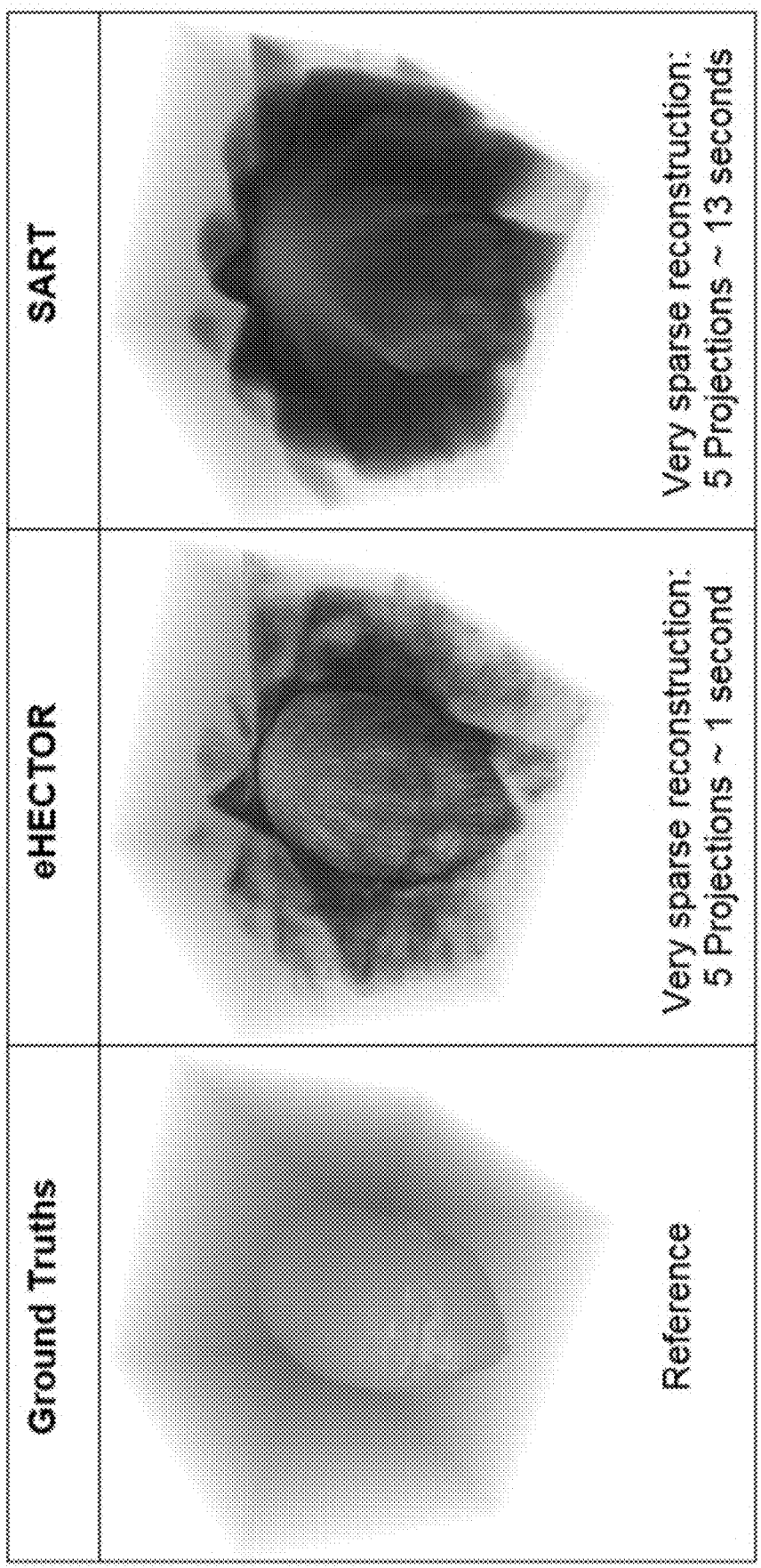

Exemplary results of this approach are shown in FIG. 6. The innovative eHECTOR demonstrates higher image quality and more than 10-fold higher speed when compared with CERN's Aug. 30, 2017 release of SART (Biguri et al. [21]). As shown in FIG. 6A, eHECTOR shows significantly more precise object feature reconstruction and smaller residual error than SART. Furthermore, in FIG. 6B, the preliminary version of eHECTOR demonstrates useful object reconstruction results from sparse projection data sets, e.g. five projections, with those obtained by CERN's SART (32 iterations). FIGS. 6A and 6B show eHECTOR and SART implemented at the Basser Laboratory of the Eunice Kennedy Shriver National Institute of Child Health and Human Development (NICHD), National Institutes of Health (NIH). This is not an endorsement of the eHECTOR process by the NIH.

Using, for example, residual data matrices in 216, 221, 226, or 160, as shown in FIG. 2, or MMR-261, model parameter fit optimization with respect to a subset of the parameter vector p, controlled, for example, by investigator 170 in FIG. 1, minimizes these residuals representing the error between measurement and prediction. When using multiple measurement methods, such as dual energy scanning, their weighting has to be specified relative to the cost functions of the estimation problem. This numerical optimization may be used at any given analytics-based converged iteration during the iterative reconstruction algorithm. A preferred method for numerically estimating p subsequently, is the Levenberg-Marquardt procedure (LMP), applied to any of these residual data matrices. Convergence can easily be achieved, even when using 50 or more parameters. As shown for a beating coronary model projection in FIG. 3 with corresponding reconstruction in FIG. 4, using over 50 parameters representing image distortion due to using, for example: two cathode x-ray image intensifiers and their individual orientation sensitivity relative to the earth magnetic field; independent swaying of the arms of the dual C-arm gantry; mutual slight off-center of rotation alignment; timing off-set of image frame acquisition for the beating coronary model for a set of 6 projection directions; bending, twisting, and pulsation of the coronary model; and angular C-arm orientation increment errors.

The efficiency of eHECTOR is achieved using small signal approximations within the iterative loop. Good convergence of small signal operation at a given resolution supports better small signal approximation at higher, computationally more expensive, resolution. Switching to higher resolution should therefor occur when the small signal approximations appear to be "good enough", for example, the loop-effect of non-linearity deviates less than 10% from a linear model. This linearity objective should apply at least to data representing high densities or important areas, for example, density values higher than one percent of the peak density. Several approaches to achieve effective convergence, including their combination, are possible:

1. Estimate, from theoretical and experimental evaluation, expected iteration counts needed for each level of resolution. Expected convergence may apply to particular reconstruction scenarios, for example, reconstruction of crania;
2. Proceed with iterations at a given resolution while residual object data values contract significantly between iterations. In particular, continue with iterations when residual data changes are large compared to systems noise levels, but terminate iterations when residual data changes are insignificant, for example, when their fluctuations are comparable to noise or other criteria; and/or
3. Proceed with iterations at a given resolution while influence and other nonlinear systems functions do not operate in near-linear regions (NLR), for example when input and output values of influence functions differ by more than 10% and other non-linear function input/output relations change by more than 10% when compared to the preceding iteration. Once data pass through the NLRs in all above listed functions sufficiently well through most diagnostically important regions, for example 99% of the object information containing regions, proceed with a few extra iterations, for example 1 or 2, using the efficacy of linear process error contraction, before switching to the next resolution.

For example, computation of FIG. 6 uses a combination of approaches number one and three above.

In addition, termination of any of the iterations, including at the highest resolution level, may be predetermined, limited, or derived, for example, from statistical measures and other cost criteria reaching thresholds.

Associated with the gradual increase of the grid resolution during reconstruction, spatial or temporal changes of the residuals tend to be small, and support effective linearization. Furthermore, the components of the parameter vector 1 are typically well defined below the full resolution. In this way, for example, at half of the finest grid-resolution, computation for a single update of the parameter vector 1 with 100 components and the corresponding computation of 100 parameter variations is comparable to about 12 filtered back-projections (assuming three dimensional reconstruction). A small number of parameter vector 1 updates were sufficient to achieve well-aligned reconstruction.

Similarly, systems parameterization with the parameter vector p to characterize variations of absorption-related coefficients can be used to estimate object density efficiently. Using, for example, suitable polynomials with the parameter vector 2, variable object density beam hardening absorption coefficients can model functions of local object density and the effect of the integration path-length on projections, as desired for Elbakri's et al. [8] or Humphries' estimation objective. The technique of computing the effect of absorption-related coefficients, however, may also be used to estimate parameters characterizing the imaging system, such as, for example, focal spot size, misalignment of projection directions, and advance of the patient table during the image acquisition. In fact, this method may be preferable to the use of fixed prior reconstruction parameters allowing instead self-calibration of the system, "life" systems performance validation, and reduced maintenance service requirements.

Another important aspect of image reconstruction is to include the signal-to-noise ratio (SNR). Model Based Iterative Reconstruction (MBIR), for example, uses an iterative technique of re-weighting data to achieve penalized weighted least squares (PWLS) density estimates, accounting for the SNR, wherein the weights are computed to approximate the inverse covariance of decomposed sinograms (see e.g., U.S. Pat. No. 8,923,583).

Several techniques individually or in combination allow significant simplification of density estimation avoiding re-weighting and use of inverse covariance matrices overcoming limitations described by, for example, U.S. Pat. No. 8,923,583. Such techniques include, for example:

1. use of a variance stabilizing or redesigning data transformations;
2. variable smoothing and amplification of innovation contributions so as to approximate the gain equation in Table 1; and
3. use of influence functions for robust estimation accounting for the reliability of data.

Variance Stabilizing Data Transformation

In the case of independent measurements and a variance related to their expected values, a variance stabilizing transformation $S_V$ in box 205 simplifies estimation and systems performance evaluation. For some measurement distributions computational transformations can be used based on known characteristics; for others, transformations may be evaluated numerically, rather than theoretically.

For the Poisson distribution producing projections 201, for example in SPECT, stabilizing transformations $S_V$ for box 205, are variations of the square-root transformation. An example for an approximate transformation for pixel intensity measurement data m in box 201, based on photons, with resulting data s' in box 206 is $$s' = \text{sqrt}(m) + c(m,g) \qquad [4.1]$$

where the correction c represents small deviations from the basic approximation. The correction c(m, g), q a constant, may be used to accommodate second order terms. More generally, in a variance stabilizing transformation the parameter constant q may appear as:

$$s' = f(m,q) \qquad [4.2]$$

With uncorrelated measurement noise, solution to this set of pixel-by-pixel scalar transformation may be computed quickly.

Adjusting Gain and Smoothing in Response to Noise $V_V$

In order to duplicate the properties of the optimal Kalman gain in the presence of increased measurement noise, approximated by the linear reconstruction algorithm (LRA), for example, back-projection computation in box 235, the gain equation in Table 1 suggests to reduce the gain/contribution of the innovation data using, for example, the matrix Z in box 220 or G in 225, when updating the object density of data 246. Furthermore, to support stability the slopes of functions $f_{11}$(box 205) and $f_{12}$ (box 210) may be changed.

Similarly, when measurements in some projection areas are considered more/less important than in others (e.g. associated with the nonlinear input transformation functions $f_{11}$ (box 205)), the weighting of the corresponding pixel innovations (or image data residuals 216) can be increased/decreased by scaling of residuals.

An alternative approach to reduce the influence of noise $V_v$ on object density variability is to combine projection measurements locally, e.g. by local smoothing, comparable to a reduction of the dimensionality of the estimation.

Application of Influence Functions

Influence functions can reduce the effect of outliers or departures of measurements from model assumptions and allow improved object reconstruction with little computation and little quality loss when compared to data without defects. Influence functions may be of use in any of the connections between boxes in FIG. 2. Most likely, however, influence functions may be located between boxes 200 and 205 or between boxes 215 and 220 and boxes 235 and 240 or between boxes 240 and 245. Furthermore, the influence function can be designed to account for data with variable SNR. Typically, the influence functions restrict maximal amplitudes of signals and may be redescending beyond critical input values. For example, Bouman et al. [13] study the properties of influence functions that preserve edges, and show their usefulness in maximum a posteriori (MAP) and log-likelihood estimation. Their objective, however, is to retain certain features in random fields. This is in contrast to the invention, where consistent measurement structural information may be accumulated in the estimation of the object density and randomness/entropy may be expressed in residuals.

Given imperfect measurement models in the invention, a first influence function between boxes 215 and 235, may, for example, be applied to data 216 or contained in box 220 by modifying the coefficients z, or modify the gain coefficients in box 225, operating on the residual data following the comparison of measurement and reference signals in box 215, but prior to the inversion that generates the object density update data signal in box 235. For example, in FIG. 2, the prime candidate subject to the influence function, is data 216, the residuals between transformed measurements and transformed prediction. The choice of parameters specifying this influence function depends on the values of its corresponding joint neighborhoods in pixel data 206 and 211, the distribution of function values within the pixel neighborhoods of data 216, and its change relative to previous iterations. Location and shape of any influence function within FIG. 2 may tend to be problem-specific and result from the field of the application.

Figure 5:
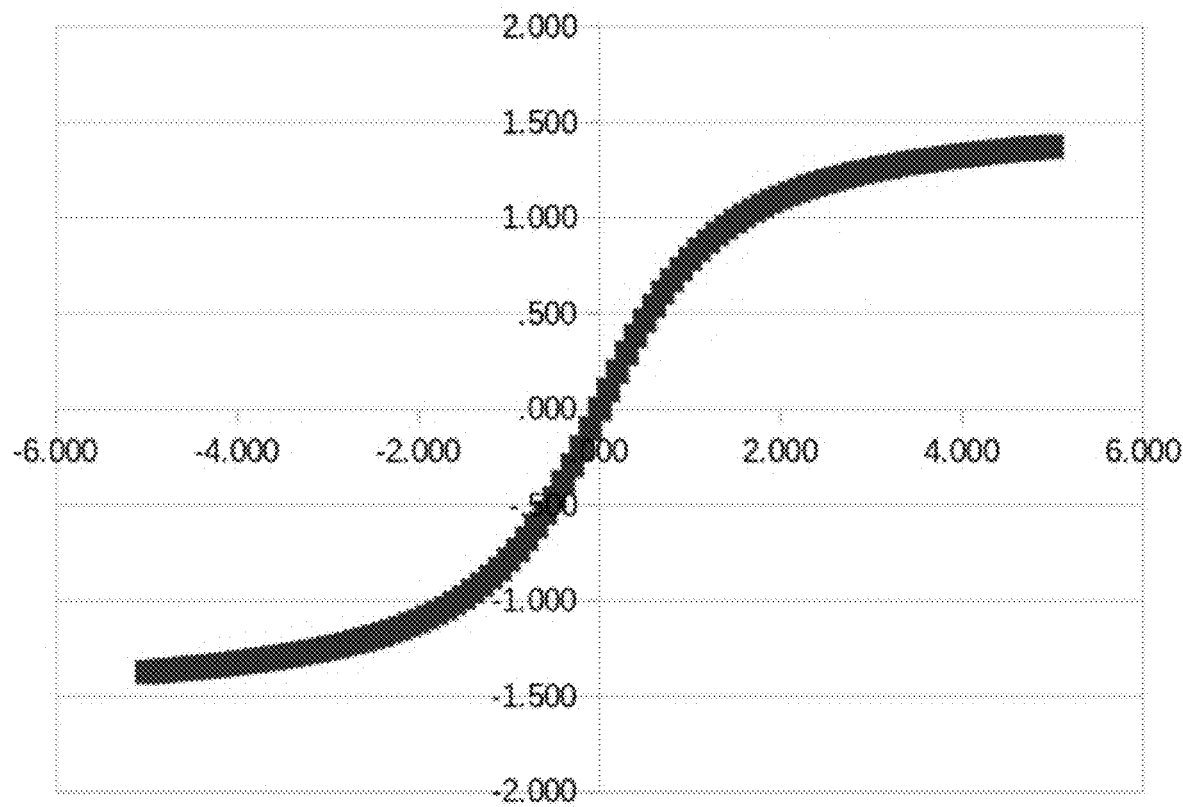
FIG. 5 depicts an example influence function.

FIG. 5 shows an example of a shape of an influence functions for use on data 216 respectively in box 220. The influence function depicts a processing dependence on data indicating the reliability of measurements, such as associated with data 201, 206, or 211. The influence function may make subsequent data processing robust against, for example, rare large erratic measurement in an environment of noisy measurements. For reference, the abscissa interval [−1, 1] in FIG. 5 contains about 67% of the sample values of data with a Gaussian distribution. For example, for a Gaussian innovation distribution with 6=1, only sample values inside this range result in near full weighting of the innovation. Center-slope may be 1.00. Asymptotic slopes may be 0.00.

The influence function can be part of the innovation gain adjustment in box 220. For example, in x-ray tomography, reconstruction of dense masses may lead to low SNR of their estimates due to corresponding low photon counts and relatively large variations of the associated projected pixel data 201. Within the invention the simplicity of using influence functions, as shown in FIG. 5, for example, in combination with variance stabilization, is computationally preferable to alternative approaches using the stabilizing penalty function S(x) with the numerically demanding minimization of the model likelihood D(y; x), when reconstructing object x from measurements y when reconstructing object x from measurements y, as proposed in U.S. Pat. No. 8,923,583, may be appreciated.

Exemplary embodiments of the invention, as discussed with respect to techniques shown in FIG. 1 and FIG. 2, for example, may be provided as software code stored on a non-transitory data storage device, such as, for example, CD-ROM, DVD, BLU-RAY, magneto-optical (MO) disk, hard disk, floppy disk, zip-disk, flash-drive, etc. The stored software code may be readable and executable by a computer having one or more processors, one or more non-transitory memory devices, such as, for example, random-access memory (RAM) devices, dynamic RAM (DRAM) devices, flash memory devices, and static RAM (SRAM) devices, etc., to perform the exemplary techniques discussed above with respect to, for example, FIG. 1 and FIG. 2.

Exemplary embodiments of the invention may provide one or more program storage and execution devices, for example, application specific integrated circuits (ASICs), field programmable gate arrays (FPGAs), complex programmable logic devices (CPLDs), application specific instruction-set processors (ASIPs), etc. for storing and executing the exemplary techniques as discussed above with respect to FIG. 1 and FIG. 2.

The examples and embodiments described herein are non-limiting examples.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

REFERENCES

The following references are referred to herein.
[1] Zeng, Gengsheng L., and Grant T. Gullberg. "Can the backprojection filtering algorithm be as accurate as the filtered backprojection algorithm?" *Nuclear Science Symposium and Medical Imaging Conference, 1994.*, 1994 *IEEE Conference Record*. Vol. 3. IEEE 1994.
[2] Yingying Zhang-O'Connor, Jeffrey A. Fessler, Fourier-Based Forward and Back-Projectors in Iterative Fan-Beam Tomographic Image Reconstruction, p. 582 IEEE Trans. Med. Imaging, Vol. 25, No. 5, May 2006.
[3] Long, Yong, Jeffrey A. Fessler, and James M. Balter. "3D forward and back-projection for X-ray CT using separable footprints." *IEEE transactions on medical imaging* 29.11 (2010): 1839-1850.
[4] Sage, A. P., J. L. Melsa, Estimation Theory with Applications to Communications and Control, The Kalman Bucy Filter, New York: McGraw-Hill, 1971. ISBN-10: 0070544298, ISBN-13: 9780070544291.
[5] Radon, J., "Uber die Bestimmung von Funktionen durch ihre Integralwerte kings gewisser Mannigfaltigkeiten," Berichte der Sächsischen Akademie der Wissenschaften, Mathematisch Physische Klasse, Leipzig, Germany, vol. 69, pp. 262-277, 1917).
[6] Schwarz, Gideon, "Estimating the Dimension of a Model." The Annals of Statistics, Vol. 6, No. 2, pp. 461-464, 1978.
[7] Akaike, H., "Stochastic Theory of Minimal Realization." IEEE Trans. On Automatic Control, Vol. AC-19, No. 6, pp. 667-674, December, 1974.
[8] Elbakri, Idris A., and Jeffrey A. Fessler. "Statistical image reconstruction for polyenergetic X-ray computed tomography." *IEEE transactions on medical imaging* 21.2 (2002): 89-99.
[9] Elbakri, Idris A., and Jeffrey A. Fessler. "Segmentation-free statistical image reconstruction for polyenergetic x-ray computed tomography with experimental validation." *Physics in medicine and biology* 48.15 (2003): 2453-2477.
[10] Humphries, T. "Technical Note: Convergence analysis of a polyenergetic SART algorithm." *Medical physics* 42, 7 (2015): 4007-4014.
[11] Staub, David, et al. "4D Cone-beam CT reconstruction using a motion model based on principal component analysis." *Medical physics* 38.12 (2011): 6697-6709.
[12] Humnphries, T., and A. Faridani. "Reconstruction of CT Images from Sparse-View Polyenergetic Data Using Total Variation Minimization." 2015 *IEEE Nuclear Science Symposium*, San Diego, Calif. 2015.
[13] Bouman, Charles, and Ken Sauer. "A generalized Gaussian image model for edge-preserving MAP estimation." *IEEE Transactions on Image Processing* 2.3 (1993): 296-310.
[14] Wood, S. L., Morf, M., "A fast implementation of a minimum variance estimator for computerized tomography image reconstruction", IEEE, Trans. on Biomed. Eng., Vol. BME-28, No. 2, pp. 56-68, 1981.
[15] Sunnegardh, Johan, Iterative Filtered Backprojection Methods for Helical Cone-Beam CT, Dissertation No. 1264, Linkopings universitet, SE-581 83 Linkoping, Sweden, August 2009.
[16] L. Paavolainen, Erman Acar, Uygar Tuna, Sari Peltonen, Toshio Moriya, Pan Soonsawad, Varpu Marjomäki, R. Holland Cheng, Ulla Ruotsalainen, Compensation of Missing Wedge Effects with Sequential Statistical Reconstruction in Electron Tomography, PLoS One. 2014; 9(10): e108978.
[17] Dempster, A. P., Laird, N. M., Rubin, D. B., Maximum Likelihood from incomplete data via the EM algorithm, J.R. Stat. Soc. Series B, vol. 39, pp. 1-38, 1977.
[18] U.S. Pat. No. 8,660,328.
[19] U.S. Pat. No. 8,660,330.
[20] U.S. Pat. No. 8,923,583.
[21] Ander Biguri, Manjit Dosanjh, Steven Hancock, Manuchehr Soleimani, TIGRE: a MATLAB-GPU toolbox for CBCT image reconstruction, Biomedical Physics & Engineering Express, Volume 2, Number 5, 8 Sep. 2016.

What is claimed is:
1. A system comprising:
a non-transitory data storage for storing projection space information, the projection space information in a density domain for an object under observation, and including one or more input projection pixels and one or more predicted projection space pixels; and
an image reconstructor computer having at least one processor, the at least one processor operable to:
receive the projection space information from the non-transitory data storage;
convert the projection space information into projection space data in the density domain;
compute preliminary transformed object density update data using the one or more input projection pixels in the density domain, the projection space data, and transformation functions;
compute transformed object voxel density update data by re-scaling the preliminary transformed object density update data using slopes derived from a set of non-linear transformations of voxel densities and inverse slopes of a set of non-linear back-transformations of corresponding transformed voxel densities;
accumulate the transformed object voxel density update data with a preceding voxel data estimate from a preceding iteration to form transformed object voxel density estimate;
compute voxel density data by transforming the transformed object voxel density estimate;
compute voxel density estimate data by re-estimating the voxel density data using object structural information;
delay the voxel density estimate data by a unit delay to obtain prior voxel density estimate data;
transform the prior voxel density estimate data to obtain the preceding voxel data estimate data;
reconstruct an object space image representing the object under observation using prior voxel density estimate data.
2. The system of claim 1, wherein the image reconstructor computer is further operable to:
smooth the voxel density data with a low-pass filter prior to re-estimating the voxel density data using object structural information.

3. The system of claim 1, wherein the preliminary transformed object update data and the transformed object voxel density estimate are processed using influence functions.

4. The system of claim 1, wherein the image reconstructor computer is further operable to:
process projection residuals with robust estimation influence functions using a priori parameters or parameters that represent or are derived from a neighborhood of the projection residuals, the parameters being functions of one or more of local input measurements, prediction values, systems properties, or a priori expected object and measurement properties.

5. The system of claim 1, wherein the image reconstructor computer is further operable to:
process projection residuals by at least one of smoothing the projection residuals over select ranges or scaling the projection residuals over select ranges.

6. The system of claim 1, wherein the preliminary transformed object density update data is computed based on a nonlinear transformation, a pixel-by-pixel innovation scaling matrix, and a tomographic reconstruction algorithm.

7. The system of claim 1, wherein the preliminary transformed object density update data is computed based on a reconstruction algorithm using pixel-by-pixel signal data gains.

8. The system of claim 1, wherein the preliminary transformed object density update data is computed based on:
a pixel-by-pixel innovation scaling matching matrix; and
a weighted combination of inverse slopes of a nonlinear input transformation function and inverse slopes of a nonlinear reference transformation function of density domain pixel values in a neighborhood of corresponding pixel locations.

9. The system of claim 1, wherein the voxel density data is computed by back-transforming the transformed object voxel density estimate into the density domain using positive constraining functions.

10. The system of claim 1, wherein the voxel density estimate data is computed by post-processing the voxel density data to create one or more voxels based on one or more of (a) equal or increased grid resolution or (b) equal or increased density value resolution.

11. The system of claim 1, wherein projection space data is obtained from at least one of electromagnetic (EM) energy, X-Ray energy, particle beams, infra-red energy, optical energy, or vibration energy projection acquisition processes, or from an output of other processes.

12. The system of claim 1, further comprising:
an output device to receive the object space image representing the object under observation, wherein the output device is at least one of a data storage device, a display device, a printing device, or a computer system.

13. The system of claim 1, wherein the preliminary transformed object density update data is computed based on a nonlinear transformation function.

14. The system of claim 13, wherein the nonlinear transformation function is a variance stabilizing function of the one or more input projection pixels.

15. The system of claim 13, wherein slopes of the nonlinear transformation are computed from a neighborhood of preceding and expected function input values of the nonlinear transformation.

16. The system of claim 1, wherein the image reconstructor computer is further operable to:
re-compute or correct a portion of the unreliable or missing projection space data using prediction of preceding object density voxels.

17. The system of claim 1, wherein an initial voxel density data for the voxel density data is estimated based on the projection space data.

18. The system of claim 1, wherein the preliminary transformed object density update data is computed based on a pixel-by-pixel innovation gain matrix
wherein the pixel-by-pixel innovation gain matrix is computed based on sequential nonlinear function slope properties and pixel and neighboring pixel innovation result data.

19. The system of claim 1, wherein the preliminary transformed object density update data is computed based on an in-series innovation gain matrix using sequential properties of a pixel and neighboring pixel innovation results.

20. A non-transitory data storage device storing software code executable by a computer having one or more processors, the software code to:
receive projection space information in a density domain for an object under observation, the projection space information including one or more input projection pixels and one or more predicted projection space pixels;
convert the projection space information into projection space data in the density domain;
compute preliminary transformed object density update data using the one or more input projection pixels in the density domain, the projection space data, and transformation functions;
compute transformed object voxel density update data by re-scaling the preliminary transformed object density update data using slopes derived from a set of non-linear transformations of voxel densities and inverse slopes of a set of non-linear back-transformations of corresponding transformed voxel densities;
accumulate the transformed object voxel density update data with a preceding voxel data estimate from a preceding iteration to form transformed object voxel density estimate;
compute voxel density data by transforming the transformed object voxel density estimate;
compute voxel density estimate data by re-estimating the voxel density data using object structural information;
delay the voxel density estimate data by a unit delay to obtain prior voxel density estimate data;
transform the prior voxel density estimate data to obtain the preceding voxel data estimate data;
reconstruct an object space image representing the object under observation using prior voxel density estimate data.

21. A method for image reconstruction performed by an image reconstructor computer having at least one processor, the method comprising:
receiving projection space information in a density domain for an object under observation, the projection space data including one or more input projection pixels and one or more predicted projection space pixels;
converting the projection space information into projection space data in the density domain;
computing preliminary transformed object density update data using the one or more input projection pixels in the density domain, the projection space data, and transformation functions;
computing transformed object voxel density update data by re-scaling the preliminary transformed object density update data using slopes derived from a set of non-linear transformations of voxel densities and inverse slopes of a set of non-linear back-transformations of corresponding transformed voxel densities;
accumulating the transformed object voxel density update data with a preceding voxel data estimate from a preceding iteration to form transformed object voxel density estimate;
computing voxel density data by transforming the transformed object voxel density estimate;
computing voxel density estimate data by re-estimating the voxel density data using object structural information;
delaying the voxel density estimate data by a unit delay to obtain prior voxel density estimate data;
transforming the prior voxel density estimate data to obtain the preceding voxel data estimate data;
reconstructing an object space image representing the object under observation using prior voxel density estimate data.

* * * * *